(12) United States Patent
Abe

(10) Patent No.: US 10,306,082 B2
(45) Date of Patent: May 28, 2019

(54) SYSTEM, SERVERS AND CONTROL METHOD THEREOF, FOR EXECUTING PROCESS WITH WEB APPLICATION, JOB PROCESSING APPARATUS AND CONTROL METHOD THEREOF, AND NON-TRANSITORY COMPUTER-READABLE MEDIUM

(71) Applicant: CANON KABUSHIKI KAISHA, Tokyo (JP)

(72) Inventor: Koichi Abe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/157,076

(22) Filed: Jan. 16, 2014

(65) Prior Publication Data
US 2014/0218762 A1    Aug. 7, 2014

(30) Foreign Application Priority Data
Feb. 7, 2013    (JP) .................................. 2013-022645

(51) Int. Cl.
    *H04N 1/00*         (2006.01)
    *G06K 15/02*       (2006.01)
    *G06F 3/12*         (2006.01)

(52) U.S. Cl.
CPC ......... *H04N 1/00278* (2013.01); *G06F 3/126* (2013.01); *G06F 3/1212* (2013.01); *G06F 3/1288* (2013.01); *G06K 15/1803* (2013.01); *H04N 1/00923* (2013.01); *H04N 1/00954* (2013.01)

(58) Field of Classification Search
CPC .......................... G06K 15/1803; G06F 3/1296
See application file for complete search history.

(56) References Cited

U.S. PATENT DOCUMENTS 6,976,072 B2 * 12/2005   Mathieson ..................... 709/224
7,752,362 B2 *   7/2010   Nishimoto et al. ............. 710/74
(Continued)

FOREIGN PATENT DOCUMENTS

JP      2009-267701 A     11/2009

OTHER PUBLICATIONS

D. Hardt (Ed.); "The OAuth 2.0 Authorization Framework"; Internet Engineering Task Force; ISSN: 2070-1721; Oct. 2012, p. 1-131. http://code.google.com/apis/cloudprint/docs/overview.html.

*Primary Examiner* — Lennin Rodriguezgonzalez
(74) *Attorney, Agent, or Firm* — Rossi, Kimms & McDowell LLP

(57) ABSTRACT

A job management server, which is connected to a Web application server and a job processing apparatus via a network, comprises: a registration unit which registers, when a job received from the Web application server is added with information indicating that a request source of the job is the job processing apparatus, the job in a first job queue, and to register, when the job is not added with the information, the job in a second job queue having a lower priority than the first job queue; and a transmission unit which transmits the job registered in the first job queue in response to a request from the job processing apparatus while a user utilizes a Web application via the job processing apparatus.

21 Claims, 29 Drawing Sheets

(56) References Cited

U.S. PATENT DOCUMENTS

| | | | | |
|---|---|---|---|---|
| 2011/0078683 A1* | 3/2011 | Yamamoto | ............ | G06F 9/4443 |
| | | | | 718/100 |
| 2011/0145329 A1* | 6/2011 | Fukasawa | .......... | H04N 1/00411 |
| | | | | 709/203 |
| 2013/0188221 A1* | 7/2013 | Ohno | .................... | G06F 3/1296 |
| | | | | 358/1.15 |

\* cited by examiner

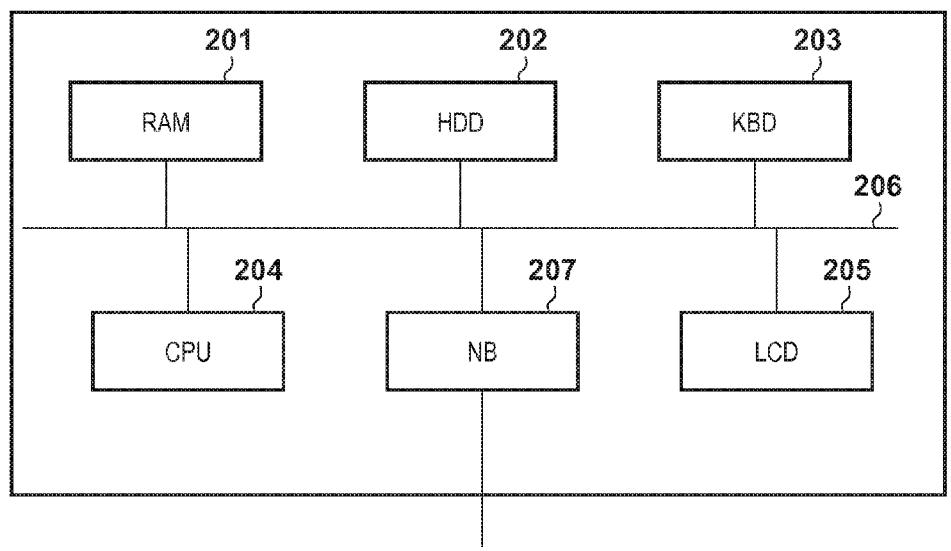
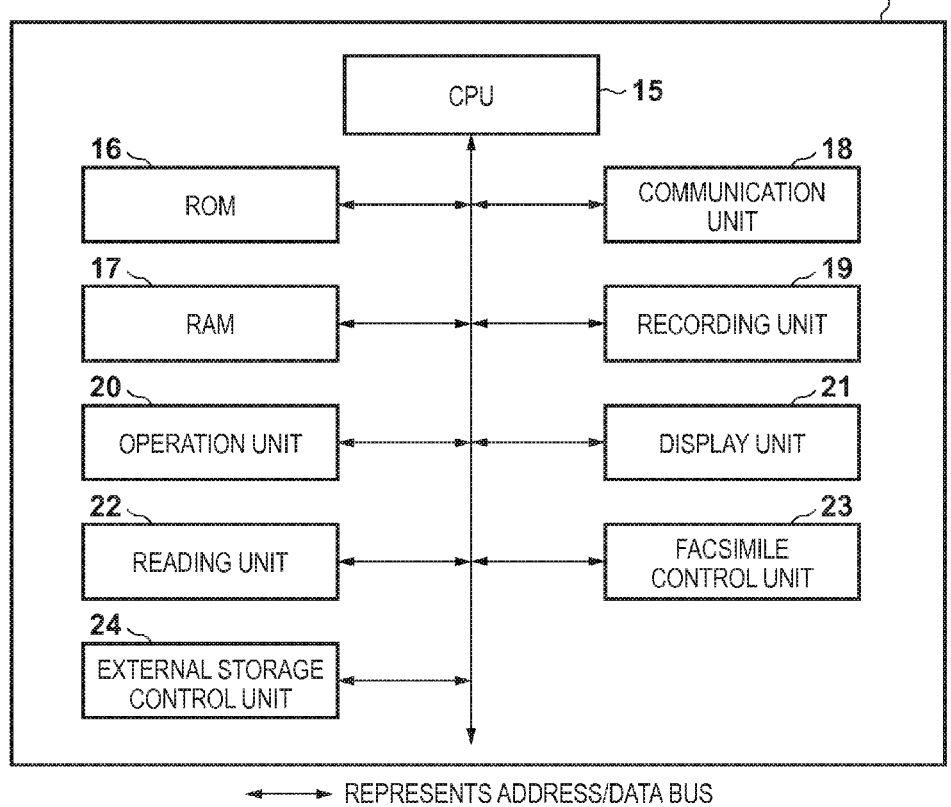

FIG. 18A

| TYPE OF QUEUE | JOB ID | ISSUED YEAR/MONTH/DAY/TIME |
|---|---|---|
| TOP PRIORITY JOB QUEUE (PRIORITY: FIRST, SIZE: 1) | prn0004 | 20120814122435001 |
| GENERAL SCAN QUEUE<br><br>(PRIORITY: SECOND, SIZE: NO LIMIT) | scn0304 | 20120814122045250 |
| | scn0305 | 20120814122130500 |
| | | |
| GENERAL PRINT QUEUE<br><br>(PRIORITY: THIRD, SIZE: NO LIMIT) | prn0001 | 20120814121812100 |
| | prn0002 | 20120814121850004 |
| | prn0003 | 20120814121920010 |
| | | |

FIG. 18B

| TYPE OF QUEUE | JOB ID | ISSUED YEAR/MONTH/DAY/TIME |
|---|---|---|
| JOB QUEUE<br><br>(PRIORITY: FIRST, SIZE: NO LIMIT) | prn0010 | 20120814070715000 |
| | prn0011 | 20120814071020300 |
| | scn0408 | 20120814071530101 |
| | prn0012 | 20120814072033088 |
| | prn0013 | 20120814072501202 |
| | | |
| | | |

FIG. 18C

| TYPE OF QUEUE | JOB ID | ISSUED YEAR/MONTH/DAY/TIME |
|---|---|---|
| TOP PRIORITY JOB QUEUE (PRIORITY: FIRST, SIZE: 1) | scn0306 | 20120814122423008 |
| GENERAL SCAN QUEUE<br><br>(PRIORITY: SECOND, SIZE: NO LIMIT) | scn0304 | 20120814122045250 |
| | scn0305 | 20120814122130500 |
| | | |
| GENERAL PRINT QUEUE<br><br>(PRIORITY: THIRD, SIZE: NO LIMIT) | prn0002 | 20120814121812100 |
| | prn0003 | 20120814121850004 |
| | prn0004 | 20120814121920010 |
| | | |

FIG. 18D

| TYPE OF QUEUE | JOB ID | ISSUED YEAR/MONTH/DAY/TIME |
|---|---|---|
| TOP PRIORITY JOB QUEUE<br><br>(PRIORITY: FIRST, SIZE: NO LIMIT) | prn0004 | 20120814122435001 |
| | prn0005 | 20120814122440005 |
| | prn0006 | 20120814122445008 |
| | | |
| GENERAL SCAN QUEUE<br><br>(PRIORITY: SECOND, SIZE: NO LIMIT) | scn0304 | 20120814122045250 |
| | scn0305 | 20120814122130500 |
| | | |
| GENERAL PRINT QUEUE<br><br>(PRIORITY: THIRD, SIZE: NO LIMIT) | prn0001 | 20120814121812100 |
| | prn0002 | 20120814121850004 |
| | prn0003 | 20120814121920010 |

FIG. 19A

| ID | INFORMATION |
|---|---|
| JOB ID | ISSUED YEAR/MONTH/DAY/TIME |
| | HOST (mfp, phone, etc.) |
| | OWNER NAME |
| | DEVICE ID |
| | JOB TICKET PATH (URI) |
| | PRINT IMAGE DATA PATH (URI) |
| | STATUS |
| | PRESENCE/ABSENCE OF NECESSITY OF JOB NOTIFICATION |
| | JOB PRIORITY |

FIG. 19B

| ID | INFORMATION |
|---|---|
| JOB ID | ISSUED YEAR/MONTH/DAY/TIME |
| | HOST (mfp, phone, etc.) |
| | OWNER NAME |
| | DEVICE ID |
| | JOB TICKET PATH (URI) |
| | UPLOAD DESTINATION PATH (URI) |
| | TEMPORARY UPLOAD DESTINATION PATH (URI) |
| | STATUS |
| | PRESENCE/ABSENCE OF NECESSITY OF JOB NOTIFICATION |
| | JOB PRIORITY |

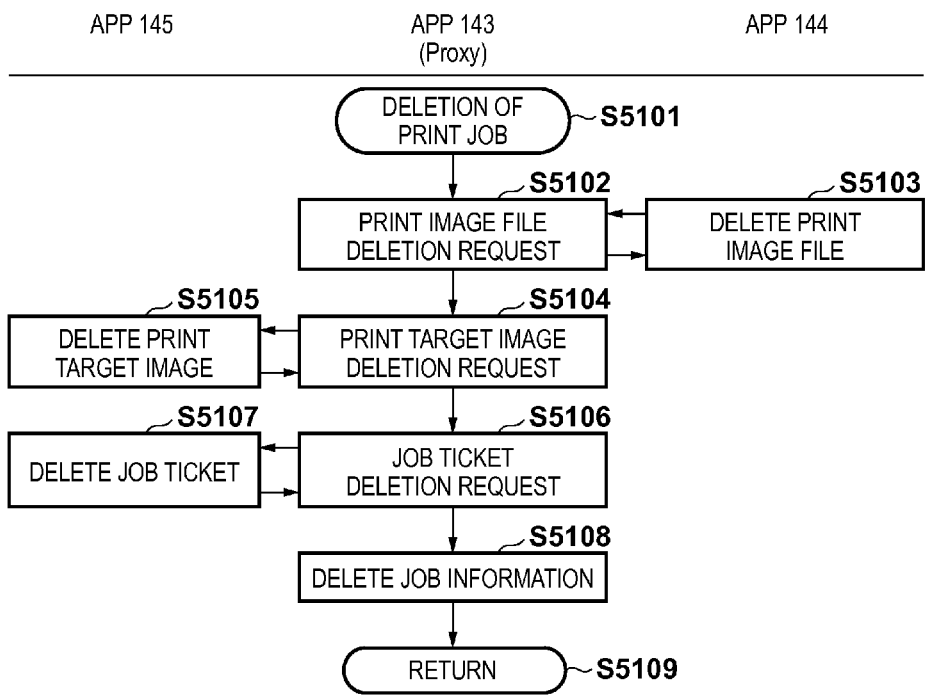
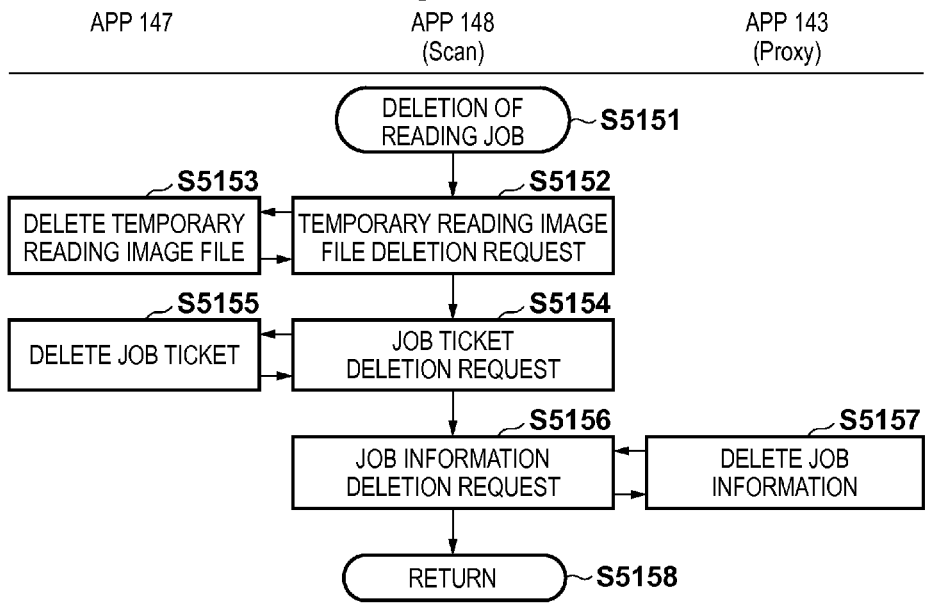

F I G. 22A
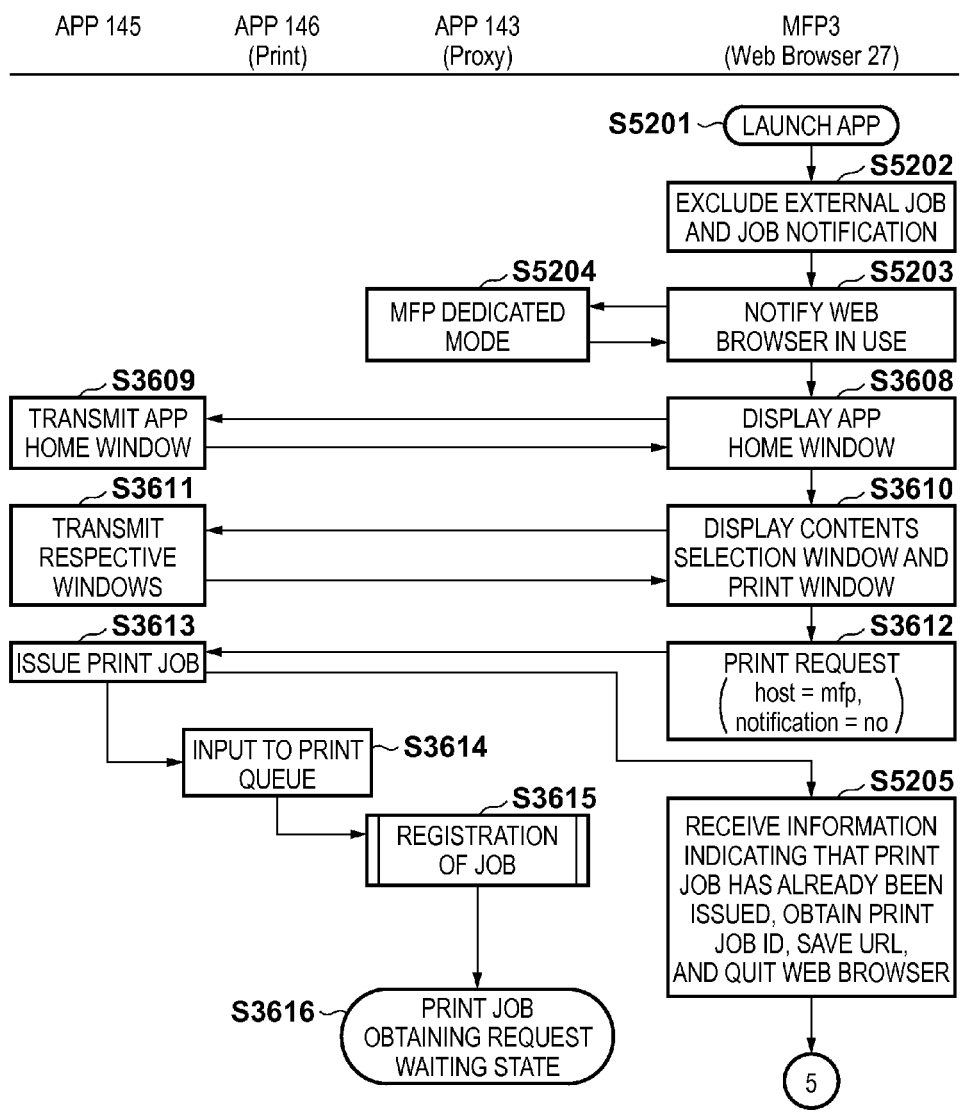

F I G. 23A
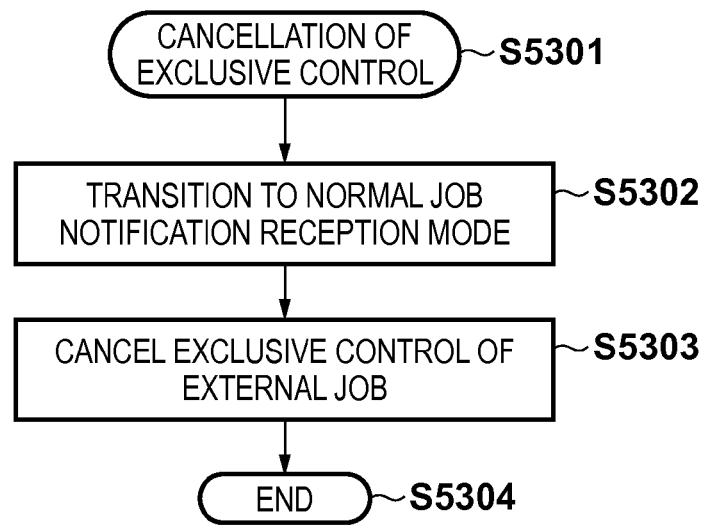
F I G. 23B
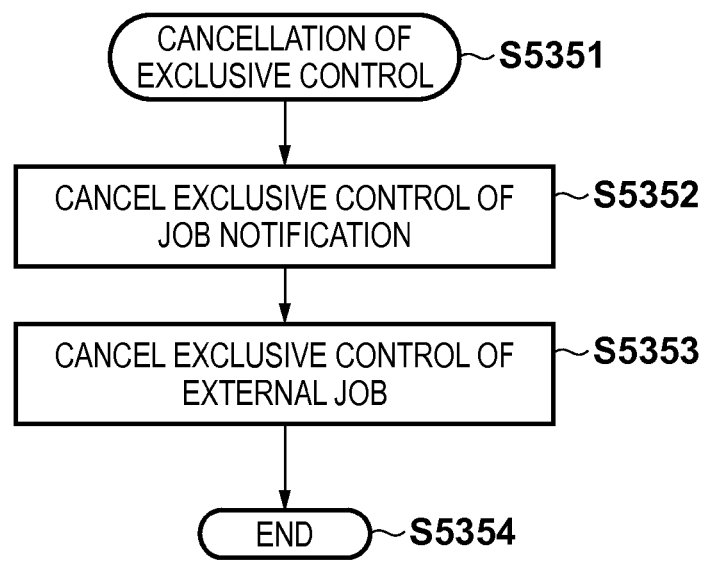

SYSTEM, SERVERS AND CONTROL METHOD THEREOF, FOR EXECUTING PROCESS WITH WEB APPLICATION, JOB PROCESSING APPARATUS AND CONTROL METHOD THEREOF, AND NON-TRANSITORY COMPUTER-READABLE MEDIUM

BACKGROUND OF THE INVENTION

Field of the Invention

The present invention relates to a system, job management server and control method thereof, job processing apparatus and control method thereof, and non-transitory computer-readable medium.

Description of the Related Art

In recent years, a peripheral apparatus control system, which connects peripheral apparatuses to an information processing apparatus by utilizing various interfaces such as USB, Ethernet®, and a wireless LAN, is effectively used in various sites such as home and an office. As examples of peripheral apparatuses, a printer, copying machine, facsimile, scanner, digital camera, MFP (Multi-Function Peripheral) thereof, and the like are known.

To a printer and MFP of these peripheral apparatuses, for example, Google Inc. provides a cloud printing service called Google Cloud Print® (to be abbreviated as "GCP" hereinafter) utilizing the Internet. Using the cloud printing service, the user can launch (utilize) a document creation application (Web application) or the like using a Web browser installed in a personal computer (to be abbreviated as "PC" hereinafter) or mobile terminal, and can print a document using the printer or MFP.

Some advanced MFPs incorporate a Web browser. During an operation of a Web browser of an MFP by a certain user, that MFP can simultaneously execute print processing of a print job which is issued by another user from a PC or mobile terminal to the MFP while executing parallel processing in the background. Likewise, during an operation of a Web browser of an MFP by a certain user, when another user scans an original using that MFP from a PC, mobile terminal, or the like, the MFP can simultaneously scan the original while executing processing related to the Web browser. The user can launch (utilize) a document creation Web application using the Web browser incorporated in such MFP without using the PC or mobile terminal and can print a document using the MFP via the Internet. Also, the user can scan an original using the MFP while operating the Web browser incorporated in that MFP, and can upload an obtained scan image onto an image storage Web service or the like via the Internet.

In case of the scan, as another technique especially related to exclusive control of a job, Japanese Patent Laid-Open No. 2009-267701 is known. Japanese Patent Laid-Open No. 2009-267701 starts exclusive control which is executed not to accept any scan-related requests from terminal apparatuses other than that of a distribution destination before a scan-related request is accepted, and ends the exclusive control after scanned scan data is distributed to the terminal apparatus of the distribution destination.

A case will be examined below wherein the control system utilizing the aforementioned advanced MFP is broken down to that utilizing a low-end (that is, low-function) MFP. For example, some low-end MFPs incorporate a Web browser. Such low-end MFP includes a low-speed CPU, small-capacity memory (RAM), and the like, and often does not include a sufficient storage area. For this reason, due to insufficient hardware resource, during an operation of a Web browser of the MFP by a certain user, the MFP cannot simultaneously execute print processing of a print job which is issued by another user from a PC, mobile terminal, or the like. Also, during an operation of the Web browser of the MFP by a certain user, even when another user wants to scan an original using the MFP from a PC, mobile terminal, or the like, the MFP cannot scan that original.

A case will be examined below wherein print processing is executed using a low-end MFP, which cannot simultaneously execute print processing while executing parallel processing in the background. When a certain user launches a Web browser of the low-end MFP, and operates a document creation application or the like, that user occupies that MFP. The operability of the user when the user operates the document creation application or the like, and wants to execute print processing using the MFP will be examined. In this case, it is desired that immediately after the user makes a print start operation, a print job issued by the print start operation is immediately executed by that MFP without being interrupted by an external print job issued from another PC or the like.

A case will be examined below wherein, for example, when a certain user (user A) launches a Web browser of the MFP and operates a document creation application, another user (user B) launches a Web browser of a PC and operates a document creation application to execute print processing of documents of 100 pages. In this case, the document creation application issues a print job of the user B to the MFP. However, since the user A is using the Web browser at this MFP, print processing of the print job of the user B is not executed at this time. After that, when the user A operates the document creation application to execute print processing of documents of 3 pages, the document creation application issues a print job of the user A to the MFP. Then, after the user A closes the Web browser, the MFP starts print processing for the issued print job. However, when the MFP processes the print job of the user B issued earlier and executes print processing, the user has to wait until the print processing for 100 pages of the user B is complete. Then, before the print processing for 100 pages of the user B is complete, the user A cannot obtain printed products of his or her documents of 3 pages. In this manner, when the print job of the user A who operates the Web browser of the low-end MFP is interrupted by the print job issued by the user B by operating the Web browser, the operability drops considerably. The same applies to a scan job.

Furthermore, a case will be examined below wherein as for a job issued from each Web application by operating a Web browser of an MFP by a user, a server transmits that job notification to an MFP as a processing target. In this case, when excessive job notifications are transmitted, wasteful data communications are generated to increase the load on the server, a data volume on a communication channel increases, and higher communication cost is required according to the data traffic on the Internet. As a result, system building cost and service maintenance cost are increased.

The present invention has been made in consideration of the aforementioned problems, and, for example, in a low-end MFP prevents an interruption of a job issued from a PC or the like, and preferentially executes a job issued from an application when a user operates a Web browser of an MFP.

SUMMARY OF THE INVENTION

According to one aspect of the present invention, there is provided a system including a Web application server, a job management server, and a job processing apparatus, which are connected to each other via a network, the job processing apparatus comprising a utilizing unit configured to allow a user to utilize a Web application provided by the Web application server, the Web application server comprising: an issuing unit configured to issue, when the Web application is utilized via the utilizing unit and a request to issue a job is input, the job added with information indicating that a request source is the job processing apparatus; and a transmission unit configured to transmit the issued job to the job management server, the job management server comprising: a registration unit configured to register, when the information is added to the received job, the job in a first job queue, and to register, when the information is not added to the job, the job in a second job queue having a lower priority than the first job queue; and a unit configured to transmit the job registered in the job queue to the job processing apparatus, and the job processing apparatus further comprising: a control unit configured not to accept the job registered in the second job queue and to accept and execute the job registered in the first job queue while the user utilizes the Web application using the utilizing unit.

According to another aspect of the present invention, there is provided a job management server, which is connected to a Web application server and a job processing apparatus via a network, comprising: a registration unit configured to register, when a job received from the Web application server is added with information indicating that a request source of the job is the job processing apparatus, the job in a first job queue, and to register, when the job is not added with the information, the job in a second job queue having a lower priority than the first job queue; and a transmission unit configured to transmit the job registered in the first job queue in response to a request from the job processing apparatus while a user utilizes a Web application via the job processing apparatus.

According to another aspect of the present invention, there is provided a job processing apparatus, which is connected to a Web application server and a job management server via a network, comprising: a utilizing unit configured to allow a user to utilize a Web application provided by the Web application server; and an execution unit configured to accept and execute only a job which is requested the Web application to issue when the user uses the utilizing unit of jobs managed by the job management server while the user utilizes the Web application using the utilizing unit.

According to another aspect of the present invention, there is provided a control method of a job management server, which is connected to a Web application server and a job processing apparatus via a network, the method comprising: a registration step of registering, when a job received from the Web application server is added with information indicating that a request source of the job is the job processing apparatus, the job in a first job queue, and registering, when the job is not added with the information, the job in a second job queue having a lower priority than the first job queue; and a transmission step of transmitting the job registered in the first job queue in response to a request from the job processing apparatus while a user utilizes a Web application via the job processing apparatus.

According to another aspect of the present invention, there is provided a control method of a job processing apparatus, which is connected to a Web application server and a job management server via a network, the job management apparatus comprising a utilizing unit configured to allow a user to utilize a Web application provided by the Web application server, the method comprising: a control step of accepting and executing only a job which is requested the Web application to issue when the user uses the utilizing unit of jobs managed by the job management server while the user utilizes the Web application using the utilizing unit.

According to another aspect of the present invention, there is provided a non-transitory computer-readable medium storing a program for controlling a computer, which is connected to a Web application server and a job processing apparatus via a network, to function as: a registration unit configured to register, when a job received from the Web application server is added with information indicating that a request source of the job is the job processing apparatus, the job in a first job queue, and to register, when the job is not added with the information, the job in a second job queue having a lower priority than the first job queue; and a transmission unit configured to transmit the job registered in the first job queue in response to a request from the job processing apparatus while a user utilizes a Web application via the job processing apparatus.

According to another aspect of the present invention, there is provided a non-transitory computer-readable medium storing a program for controlling a computer, which is connected to a Web application server and a job management server via a network, to function as: a utilizing unit configured to allow a user to utilize a Web application provided by the Web application server; and an execution unit configured to accept and execute only a job which is requested the Web application to issue when the user uses the utilizing unit of jobs managed by the job management server while the user utilizes the Web application using the utilizing unit.

According to the present invention, in a system including a low-function MFP, the load on the MFP is reduced, and the operability of the MFP by the user can be improved.

Further features of the present invention will become apparent from the following description of exemplary embodiments (with reference to the attached drawings).

BRIEF DESCRIPTION OF THE DRAWINGS

FIGS. 2A and 2B are block diagrams showing examples of the hardware arrangements of a PC, mobile terminal, and MFP;

FIGS. 18A, 18B, 18C, and 18D are tables showing configuration examples of job queues in the proxy APP;

FIGS. 19A and 19B are tables used to store job information of a job registered in a job queue;

FIGS. 21A and 21B are flowcharts showing deletion processing of a print job in a proxy APP and deletion processing of a reading job in a cloud scan APP;

FIGS. 22A and 22B are flowcharts showing processing executed when a document creation APP is executed from a Web browser of an MFP according to the seventh embodiment to execute print processing; and FIGS. 23A and 23B are flowcharts showing exclusive control cancel processing in an MFP.

DESCRIPTION OF THE EMBODIMENTS

Embodiments of the present invention will be described hereinafter with reference to the drawings. Note that embodiments do not limit the present invention, and all components described in embodiments are not always indispensable for means for solving the problems of the present invention.

In the following description, a Web service API (Application Program Interface) may use an HTTPS (Hyper Text Transfer Protocol over Secure Socket Layer) POST method (an example of a communication method) encrypted by an SSL (Secure Socket Layer) communication. Since the POST method is information generally open to the public, a detailed description thereof will not be given. Also, in the following description, the Web service API may use an HTTP GET method (an example of a communication method). Since the GET method is information generally open to the public, a detailed description thereof will not be given. Furthermore, in the following description, the Web service API may use an HTTPS GET method (an example of a communication method) encrypted by an SSL communication. Since the GET method is information generally open to the public, a detailed description thereof will not be given.

Also, since the HTTP (Hyper Text Transfer Protocol) is a known non-encrypted communication protocol, a detailed description thereof will not be given. Also, since the HTTPS is a known encrypted communication protocol, a detailed description thereof will not be given. Furthermore, since the SSL is a known method for exchanging encrypted data on the Internet, a detailed description thereof will not be given. Moreover, since a description about the GCP taken as an example of a cloud print service is published on a site (URL: http://code.google.com/apis/cloudprint/docs/overview.html), a detailed description thereof will not be given. In addition, a USB (Universal Serial Bus) is a known interface which allows bidirectional communications, and a detailed description thereof will not be given.

First Embodiment

System Arrangement

Figure 1:
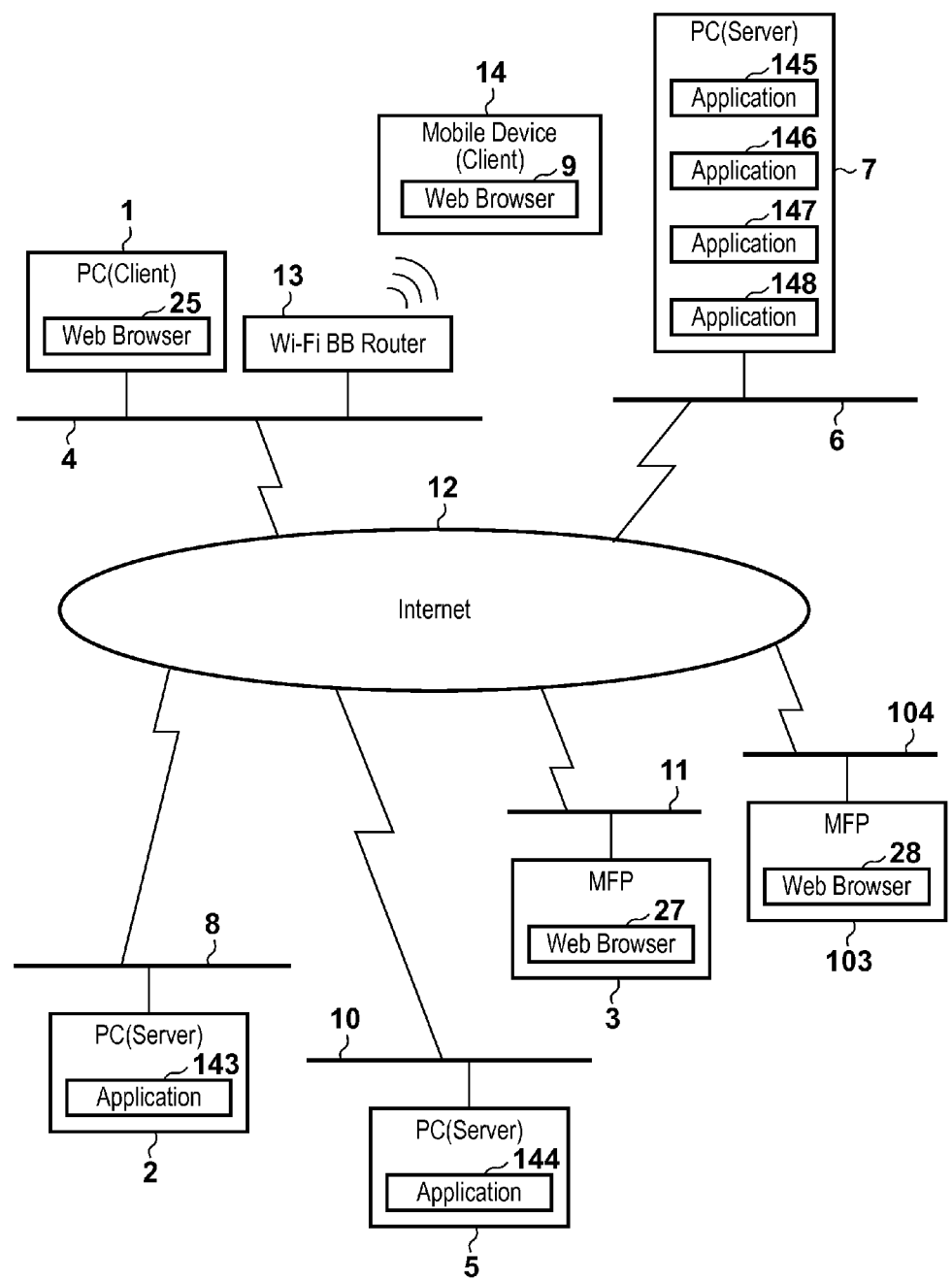
FIG. 1 is a block diagram showing an example of the arrangement of a system.

FIG. 1 is a block diagram showing an example of the arrangement of a system including information processing apparatuses and peripheral apparatuses (job processing apparatuses). Each of PCs 1, 2, 5, and 7 is an example of an information processing apparatus (computer), and is, for example, a general PC. Each of the PCs 1, 2, 5, and 7 includes hardware shown in FIG. 2A.

In the PC 1, as an Operating System (to be abbreviated as an OS hereinafter), an OS equivalent to a Chrome® OS available from Google Inc. is installed. In the PCs 2 and 5, a Windows® Server OS available from Microsoft Corporation is installed. In the PC 7, an OS equivalent to a Linux® is installed. The PCs 1, 2, 5, and 7 are respectively connected to networks 4, 8, 10, and 6 configured by interfaces (I/Fs) such as Ethernet®, and are also connected to the Internet 12. Note that the network interface may be either a wired or wireless interface.

Each of MFPs (Multi-Function Peripherals) 3 and 103 includes a color inkjet printer, color facsimile, color scanner, external storage for a flash memory, and the like, and is an example of a peripheral apparatus. The following description will be given under the assumption that each of the MFPs 3 and 103 is that having a model name "Kmmn" available from Company ABC. Note that as peripheral apparatuses, a printer, copying machine, facsimile, scanner, digital camera, apparatus which includes these multi-functions, and the like may be used. Each of the MFPs 3 and 103 includes hardware shown in FIG. 2B. The MFP 3 is connected to a network 11 configured by Ethernet®, and is also connected to the Internet 12. The MFP 103 is connected to a network 104 configured by Ethernet®, and is also connected to the Internet 12.

A router 13 is, for example, a broadband router including a Wi-Fi® wireless LAN (Wi-Fi BB Router), and is connected to the Internet 12. A mobile terminal 14 corresponds to a mobile phone, mobile information terminal, or the like. The mobile terminal 14 includes hardware shown in FIG. 2A. The mobile terminal 14 is connected to the router 13, and connected to the Internet 12 via the router 13. In the mobile terminal 14, an OS equivalent to an Android® OS available from Google Inc. is installed as an OS. The following description will be given under the assumption that the mobile terminal 14 is a mobile phone.

The PCs 1, 2, 5, and 7, the mobile terminal 14, and the MFPs 3 and 103 can make bidirectional communications via the Internet 12. A Web browser 25 is installed in the PC 1, and a Web browser 9 is installed in the mobile terminal 14. Web browsers 27 and 28 are respectively installed in the MFPs 3 and 103. The Web browsers 27 and 28 are of the same type, but the Web browsers 9, 25, and 27 are respectively of different types. HTTP user agents passed to a document creation APP 145 and cloud scan APP 148 in User-Agent headers of HTTP requests by the Web browsers 9, 25, and 27 are respectively different, and for example, they are defined as follows.

User agent of the Web browser 9 of the mobile terminal 14: User-Agent: XXXX/5.0 (AAAA)

User agent of the Web browser 25 of the PC 1: User-Agent: XXXX/6.0 (CCCC)

User agent of the Web browser 27 of the MFP 3: User-Agent: YYYY/4.0 (DDDD)

"AAAA", "CCCC", and "DDDD" represent pieces of information required to identify respective terminals. Each of a document creation APP 145 and cloud scan APP 148 can discriminate whether a terminal of interest is any of the mobile terminal 14, PC 1, and MFP 3 using these pieces of information, and can switch a window to be displayed by that application and internal processing.

An application 145 is a document creation application using a Web service, and will be referred to as a document creation APP 145 hereinafter. An application 146 provides a cloud print service using a Web service, and will be referred to as a cloud print APP 146 hereinafter. An application 147 is that required to read an image and document using a Web service, and will be referred to as a reading APP 147 hereinafter. An application 148 provides a cloud scan service using a Web service, and will be referred to as a cloud scan APP 148 hereinafter.

The cloud print APP 146 has a function equivalent to, for example, the GCP provided by Google Inc. By utilizing this cloud print service, the document creation APP 145 is executed from the Web browser 25 of the PC 1 or the Web browser 9 of the mobile terminal 14, an arbitrary document (document file) is opened, and can be printed using the MFP 3 or 103. With these applications, the PC 7 functions as a Web application server.

Figure 4:
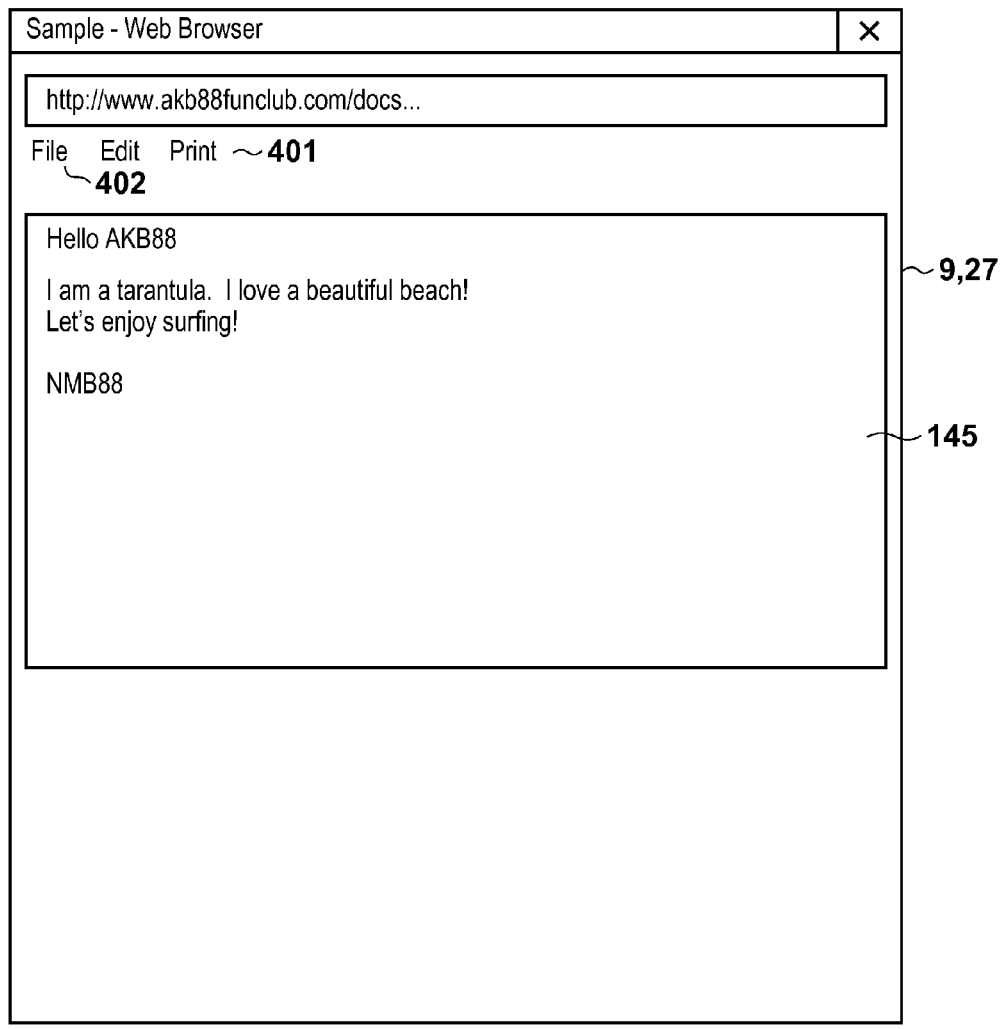
FIG. 4 is a view showing an example of a window of a document creation APP displayed by a Web browser.
Figure 5:
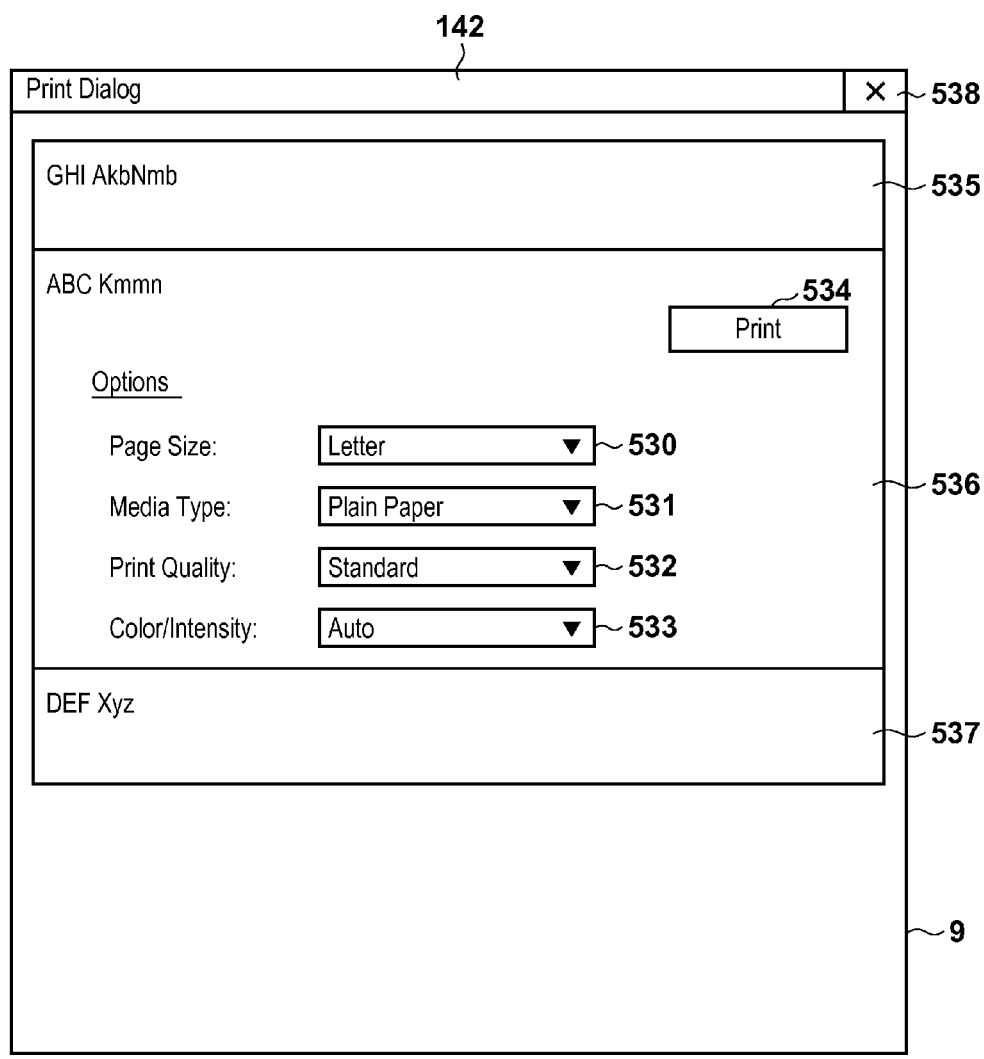
FIG. 5 is a view showing an example of a print window.

FIGS. 4 and 5 show examples of user interfaces (UIs) displayed by the Web browser. Note that details will be described later. For example, when the user wants to print an opened document, and selects a print menu 401 shown in FIG. 4, a print window 142 shown in FIG. 5 is displayed by the cloud print APP 146. When the user selects a printer on the print window 142 and then presses a print button 534 to input a print execution instruction, the document creation APP 145 generates a print image as a PDF file. Then, the cloud print APP 146 generates a print job from this print image (PDF file) and print setting values selected on the print window 142, and stores a print job in a print queue for the selected printer in the cloud print service. Also, the cloud print APP 146 transmits a print job notification. A transmission destination of the print job notification is a printer as a print target or an apparatus (a proxy APP 143 in an example of this embodiment to be described later) which relays the notification to a printer.

When the MFP includes a rendering function of a PDF file, it can print the print job stored in the print queue. However, a low-end MFP (lower function) does not normally include a rendering function of a PDF file. Therefore, when the print job stored in the print queue is to be printed by such MFP, processing for converting the print image of the PDF file into an image format (for example, a JPEG format) of a type which can be rendered by the low-end MFP as pre-processing becomes necessary.

The cloud scan APP 148 provides a cloud scan service which can upload image data of photos and documents read by the MFPs 3 and 103 onto a data sharing site. As an example of the data sharing site, "Picasa Web Albums" provided by Google Inc. is known. By utilizing such cloud scan service, the MFP reads a photo or the like via the reading APP 147 executed from the Web browser of the PC 1 or mobile terminal 14 to generate image data, and can upload that image data to a Web service such as the data sharing site. An embodiment of the cloud scan will be described later in the third embodiment.

An application 143 provides a proxy service which controls the MFP to support the cloud print service provided by the cloud print APP 146 and the cloud scan service provided by the cloud scan APP 148. The application 143 will be referred to as a proxy APP 143 hereinafter. The proxy APP 143 installed in the PC 2 simultaneously manages, for example, 5000 MFPs. Then, the proxy APP 143 controls these MFPs to support the cloud print service provided by the cloud print APP 146 and the cloud scan service provided by the cloud scan APP 148. The proxy APP 143 includes print queues and scan queues shown in FIGS. 18A to 18D. With these applications, the PC 2 functions as a job management server. Details of the queues will be described later.

The cloud print APP 146 or cloud scan APP 148 issues and assigns a device ID (identifier), which is expressed by a value unique to each MFP, upon registration of the MFP, and notifies the MFP as a registration target of the device ID. Note that processing related to registration of the MFP uses the conventional method, and a detailed description thereof will not be given.

An application 144 provides an image conversion service for converting a PDF file into a JPEG file, and will be referred to as an image conversion APP 144 hereinafter.

[Hardware Arrangement]

FIGS. 2A and 2B are block diagrams showing example of the hardware arrangements of the PC, mobile terminal, and MFP. Each of the PCs 1, 2, 5, and 7 and the mobile terminal 14 includes hardware shown in FIG. 2A. The hardware arrangement of the PC 2 will be exemplified below with reference to FIG. 2A. The PC 2 includes a random access memory unit (RAM 201), hard disk drive unit (HDD 202), keyboard unit (KBD 203), CPU 204, display (LCD 205), and network board (NB 207). Also, the PC 2 includes a bus 206 which interconnects the aforementioned units.

Note that the HDD 202 is an example of a storage unit. The storage unit may be a portable CD-ROM, internally fixed ROM, flash memory, SSD, or the like. The KBD 203 is an example of an input unit. The CPU 204 is an example of a control unit. The LCD 205 is an example of a display unit. The NB 207 is an example of a communication control unit. Programs of the proxy APP 143, respective modules (software) shown in FIG. 3, and the like are stored in the HDD 202, and are read out onto the RAM 201 as needed by the CPU 204 when they are executed. Thus, the function of the proxy APP 143, those of the respective modules (software) shown in FIG. 3, and the like are implemented. Also, various databases (DBs) are allocated in the HDD 202, and information of each database is read out onto the RAM 201 as needed by the CPU 204.

Each of the MFPs 3 and 103 includes hardware shown in FIG. 2B. The hardware arrangement of the MFP 3 will be exemplified below with reference to FIG. 2B. A CPU 15 includes a microprocessor and the like. The CPU 15 serves as a central processing unit of the MFP 3, and controls a RAM 17, communication unit 18, recording unit 19, operation unit 20, display unit 21, reading unit 22, facsimile control unit 23, and external storage control unit 24 in accordance with programs stored in a ROM 16.

The ROM 16 stores programs required for the MFP 3 to execute recording (print) processing, processing for notifying the PC of a printer operation status, and the like under the control of a printer driver (not shown). Also, the ROM 16 stores programs required for the MFP 3 to execute facsimile transmission processing or reception processing and processing for notifying the PC of a facsimile operation (transmission or reception) status under the control of a FAX driver (not shown). Furthermore, the ROM 16 stores programs required for the MFP 3 to execute image reading processing and processing for notifying the PC of a reading operation status under the control of a WIA driver (not shown) and TWAIN driver (not shown).

The RAM 17 temporarily stores print data. The print data is mainly sent from the PC, and print processing is executed by the recording unit 19 based on the print data. Also, the RAM 17 temporarily stores image data read by the reading unit 22, facsimile transmission data sent from the PC, facsimile reception data received by the facsimile control unit 23, and the like. The communication unit 18 includes a connection port for the network 4, an analog telephone line connection port, and the like, and controls Ethernet® and facsimile analog communications. The recording unit 19 includes a recording unit configured by an inkjet recording head, color inks, carriage, recording sheet conveyance mechanism, and the like, and an electrical circuit configured by an ASIC required to generate print pulses in the recording head based on print data and the like.

For example, a file (image data) designated by a print operation or facsimile transmission operation on the application is temporarily stored in the HDD 202 of the PC 2 as a spool file of an EMF (Enhanced Metafile) format. Then, the spool file is converted into print data or facsimile transmission data including control commands of the MFP 3 via the printer driver or FAX driver, and the converted data is sent to the MFP 3 via the Internet. The print data received by the MFP 3 is converted into print pulses by the recording unit 19, and is printed on a recording sheet. Also, the facsimile transmission data received by the MFP 3 is converted into a facsimile communication protocol by the facsimile control unit 23, and is transmitted to a partner facsimile apparatus via an analog telephone line.

The operation unit 20 is configured by various buttons including a power button, reset button, and the like, and accepts an operation for the MFP 3. The display unit 21 is configured by a touch panel type liquid crystal display, and can display a status of the MFP 3, and can display and input various kinds of setting information and telephone numbers. The reading unit 22 includes an electrical circuit configured by a color image sensor, image processing ASIC, and the like, and controls a scanner function. The facsimile control unit 23 is configured by a facsimile modem, analog communication circuit, and the like, and controls facsimile transmission and reception according to a facsimile communication protocol. The external storage control unit 24 is configured by a slot required to attach a flash memory, a storage interface circuit, and the like, and controls the attached flash memory.

[Software Configuration]

Figure 3:
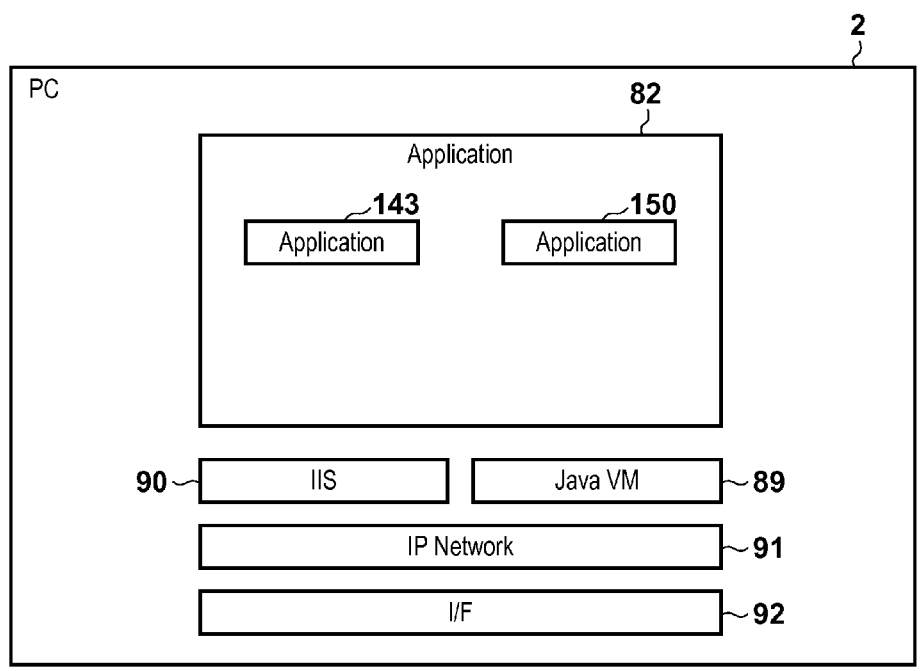
FIG. 3 is a block diagram showing an example of the software configuration.

FIG. 3 is a block diagram showing the software configuration of the PC. The software configuration of the PC 2 will be exemplified below with reference to FIG. 3. An I/F 92 is an I/F control interface required to control an I/F of Ethernet® or the like. An IP Network 91 is an IP Network control interface required to control an IP network. IIS (Internet Information Services) 90 correspond to an IIS control module which controls the IIS, and the proxy APP 143 provides a Web service by utilizing a Web server function of the IIS 90. A JAVA® VM (Virtual Machine) 89 is software required to convert Java® byte codes into native codes of a platform and to execute the converted codes. The proxy APP 143 runs on the JAVA® VM 89. Applications 82 include a plurality of applications, and include the proxy APP 143 and an application 150 in this case. Note that the application 150 indicates one general application, and is not especially limited.

[Display Window Example]

FIG. 4 is a view showing an example of a window of the document creation APP 145 of the PC 7, which is displayed by the Web browser. FIG. 4 shows a state in which a certain document is opened on the Web browser. The document creation APP 145 transmits information of this window to the mobile terminal 14, PC 1, and MFPs 3 and 103. Then, the mobile terminal 14, PC 1, and MFPs 3 and 103 receive that information and display that window on the Web browsers 9, 25, 27, and 28.

A file menu 402 includes sub menus used to open documents or contents, which are saved in advance, by displaying a content (document) selection window (not shown), and to create a new document. The user can select a document or content or can create a new document using the sub menus. Note that the content (document) selection window is configured by a window similar to a general file selection window of the PC or the like, and a description thereof will not be given. A print menu 401 accepts various operations related to print processing. For example, when the user presses the print menu 401 upon printing a document opened by operating the input unit such as the KBD 203 or operation unit 20, a print window 142 shown in FIG. 5 is displayed.

FIG. 5 is a view showing an example of the print window 142. The print window 142 is provided by the document creation APP 145 as a print setting window for the MFP 3 or 103 with respect to the user. The document creation APP 145 transmits window information of the print window 142 to the mobile terminal 14, PC 1, or the MFP 3 or 103 in response to a request. Then, the mobile terminal 14, PC 1, or the MFP 3 or 103 receives that information, and displays the print window 142 by the Web browser 9, 25, 27, or 28.

Device choices 535, 536, and 537 are those of selectable devices. The device choices 535, 536, and 537 respectively represent those of an MFP with a model name AkbNmb available from Company GHI, an MFP with a model name Kmmn available from Company ABC (corresponding to the MFP 3 of this embodiment), and an MFP with a model name Xyz available from Company DEF. FIG. 5 illustrates a state in which the device choice 536 which represents the MFP 3 is selected. When the print window 142 is displayed on the Web browser 27 of the MFP 3, the document creation APP 145 transmits information required to display the device choice 536 alone to the MFP 3, so as not to allow the user to select other devices. On the other hand, when the print window 142 is displayed on the Web browser 9 of the mobile terminal 14, the document creation APP 145 transmits information required to display the device choices 535, 536, and 537 to the mobile terminal 14, and the mobile terminal 14 receives that information and displays it on the Web browser 9. Thus, when the user operates the Web browser 9 of the mobile terminal 14, the document creation APP 145 controls to allow that user to select all devices. The same applies to the PC 1.

Using a paper size selection part 530, for example, a size of a paper sheet used in a print operation of the MFP 3 is selected from options "A5", "A4", "B5", and "Letter" according to a user operation. FIG. 5 illustrates a state in which "Letter" is selected. Using a paper type selection part 531, for example, a type of a paper sheet used in a print operation of the MFP 3 is selected from options "Plain Paper", "Photo Paper", and "Postcard" according to a user operation. FIG. 5 illustrates a state in which "Plain Paper" is selected.

Using a print quality selection part 532, for example, a print quality used in a print operation of the MFP 3 is selected from options "High", "Standard", and "Fast" according to a user operation. FIG. 5 illustrates a state in which "Standard" is selected. Using a color/density selection part 533, for example, a color and density used in a print operation of the MFP 3 are selected from options "Auto" and "Manual" according to a user operation. FIG. 5 illustrates a state in which "Auto" is selected.

A print button 534 accepts a print start instruction. When the print button 534 is pressed by a user operation, the document creation APP 145 generates a print job for the MFP 3, which is associated with the device choice 536, and issues that print job to the cloud print APP 146. A close button 538 accepts a close instruction of the print window 142. When the close button 538 is pressed by a user operation, the document creation APP 145 closes the print window 142.

[Processing Sequence]

FIGS. 6A to 17 and FIGS. 21A to 23B show examples of flowcharts related to the processing of the overall control system. Programs related to these flowcharts are embedded in the PC or MFP. Programs of applications which run on the PC are stored in the HDD 202, and are read out onto the RAM 201 by the CPU 204 when they are executed. Programs of applications which run on the MFP are stored in the ROM 16, and are read out onto the RAM 17 when they are executed by the CPU 15.

Figure 13:
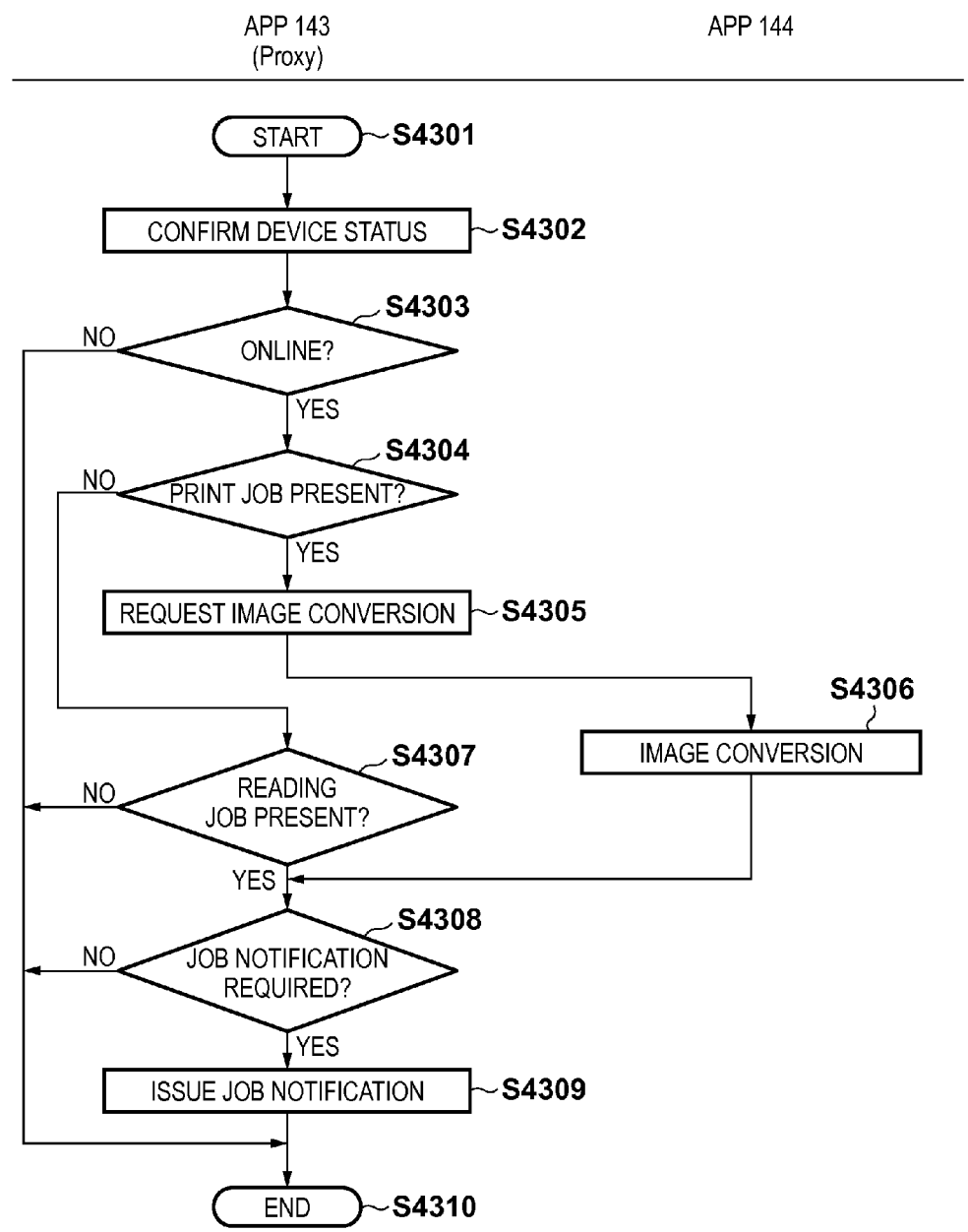
FIG. 13 is a flowchart showing job notification processing in the proxy APP.

In FIGS. 6A, 6B, 8A, 8B, 9A, 9B, 21B, 22A, and 22B, the document creation APP 145 (or reading APP 147), cloud print APP 146 (or cloud scan APP 148), proxy APP 143, and MFP 3 (Web browser 27) are described in turn from the left side of the drawings as processing execution sources (main bodies). In FIGS. 7A, 7B, 10A, and 10B, the mobile terminal 14 (Web browser 9), cloud print APP 146 (or cloud scan APP 148), proxy APP 143, document creation APP 145 (or reading APP 147), and MFP 3 (Web browser 27) are described in turn from the left side of the drawings as processing execution sources. In FIGS. 13, and 21A, the document creation APP 145, proxy APP 143, and image conversion APP 144 are described in turn from the left side of the drawings as processing execution sources. However, if there is no processing for a certain execution source, the execution source is omitted. Cases will be exemplified below wherein the user executes a document print operation (a series of processes related to printing a document) and photo reading operation by the MFP 3 using the mobile terminal 14 or MFP 3.

(Processing when MFP Issues Print Instruction)

Figure 6A:
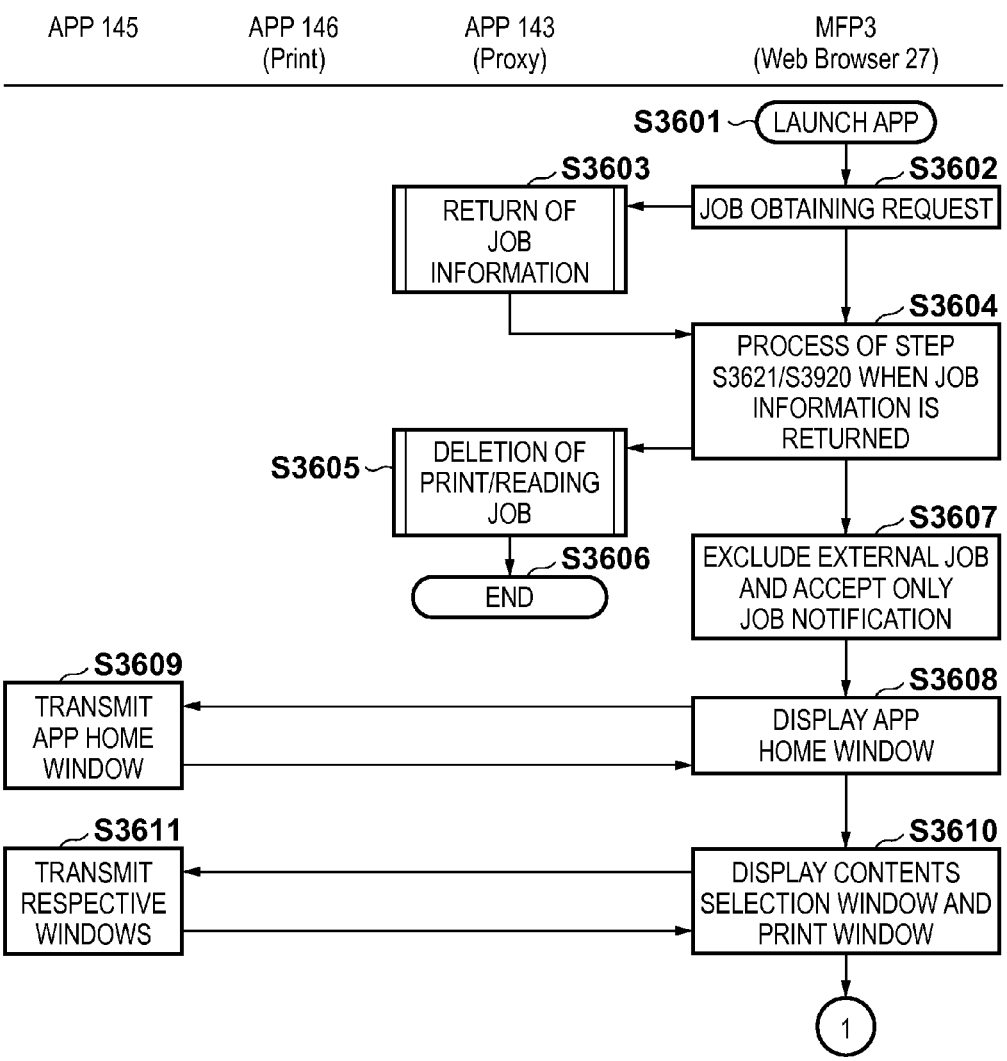
FIGS. 6A and 6B are flowcharts showing processing executed when a document creation APP is executed from a Web browser of an MFP according to the first embodiment to execute print processing.
Figure 6B:
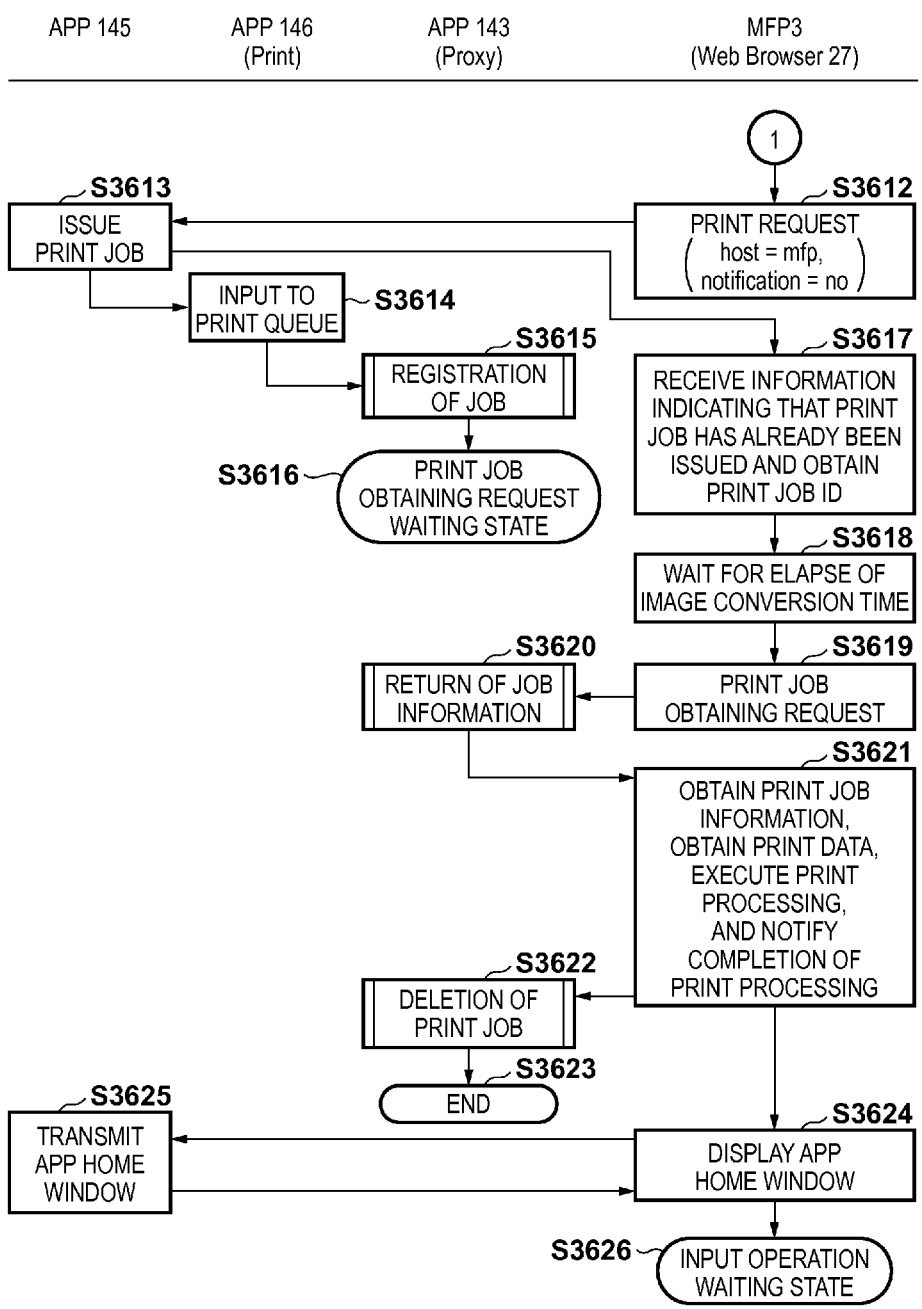

FIGS. 6A and 6B show an example of the flowchart showing processing executed when the document creation APP 145 is executed from the Web browser 27 of the MFP 3 to execute a print operation. In FIGS. 6A and 6B, when the user launches the Web browser 27 of the MFP 3 and requests it to execute the document creation APP 145, this processing sequence is started (step S3601). The MFP 3 issues a job obtaining request to the proxy APP 143 (step S3602). The proxy APP 143 executes job information return processing shown in FIG. 14, and returns that processing result to the MFP 3 (step S3603).

In step S3604, the MFP 3 receives print job information or reading job information like the following examples, and executes print processing (step S3621) or reading processing (step S3920).

[Example of Print Job Information]
jobId: prn0004
dateTime: 20120814122435001
host: mfp
owner: chancy
deviceId: 77778888
ticketUri:
https://ske88funclub.com/print/ticket/prn0004/ticket.xml
dataUri:
https://ske88funclub.com/print/data/prn0004/data.jpg
status: queued

[Example of Reading Job Information]
jobId: scn0306
dateTime: 20120814122423008
host: mfp
owner: chancy
deviceId: 77778888
ticketUri:
https://ske88funclub.com/scan/ticket/scn0306/ticket.xml
uploadUri:
https://storageservice.xxx/user/chancy/private/
temporaryUploadUri:
https://ske88funclub.com/scan/data/scn0306/
status: queued After completion of the print processing or reading processing, the MFP 3 notifies the proxy APP 143 of that information (step S3604). In step S3605, the proxy APP 143 executes job deletion processing shown in FIGS. 21A and 21B, thus ending a series of processes related to that job (step S3606).

Note that a job request to the MFP 3 is also issued from a device other than the Web browser 27 of the MFP 3, and a job is registered in the queue of the proxy APP 143. For example, when the user issues a print job from the mobile terminal 14 to the MFP 3 in a power-OFF state of the MFP 3, that job is accumulated in the queue, and the MFP 3 normally executes that print job when it is turned on. At this time, the MFP 3 may fail to execute that print job due to an arbitrary internal error or the like, and the job may remain accumulated in the queue in some cases. Alternatively, when the user issues a print job by operating the Web browser 27 of the MFP 3 in a power-ON state of the MFP 3, that job may remain accumulated in the queue due to arbitrary error termination of the Web browser 27 in some cases.

In such situation, when the MFP 3 issues the job obtaining request to the proxy APP 143 in step S3602, whether or not a job to the MFP 3 remains is confirmed. Then, when a job remains in the queue, the MFP 3 normally preferentially executes a job which is issued earlier (the MFP 3 re-executes that job when it has failed to execute that job). That is, even when a Web application is used via the Web browser 27 of the MFP 3, jobs are executed in an order they are issued.

The present invention has as its object to execute a job issued when the user operates the Web browser 27 of the MFP 3 by attaching top priority to that job. For this reason, for example, when the MFP 3 issues a job obtaining request to the proxy APP 143 in step S3602, it designates an option to obtain only a job in a top priority job queue in the job queue shown in FIG. 18A. Then, only when a job is registered in the top priority job queue, the proxy APP 143 returns job information to the MFP 3. Thus, a job issued from an application launched by the user from the Web browser 27 of the MFP 3 is executed to have the top priority, and the user can most preferentially operate respective applications such as the document creation APP 145 by operating the Web browser 27.

Figure 16A:
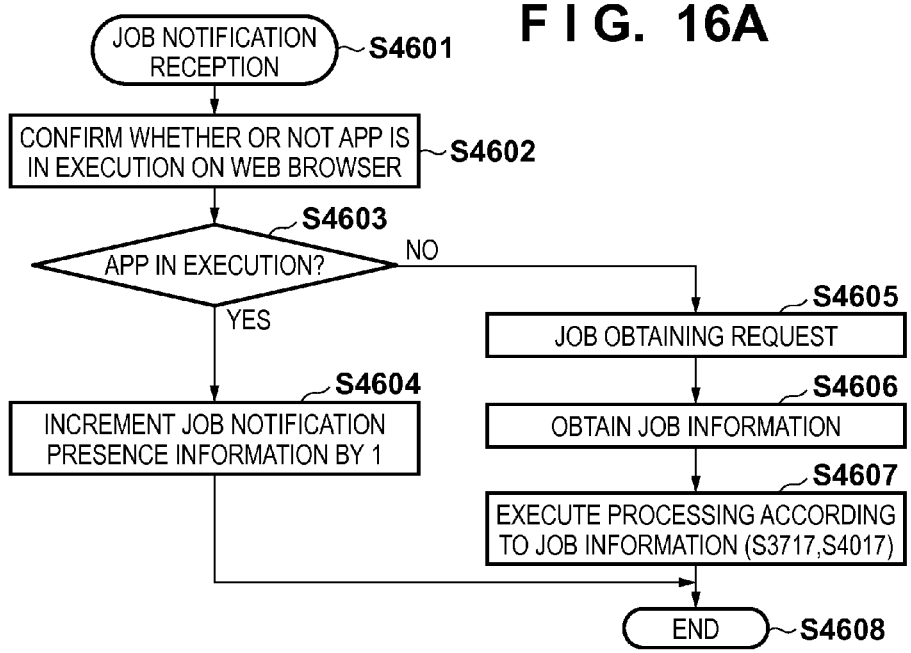
FIGS. 16A and 16B are flowcharts showing job notification reception processing in an MFP.
Figure 16B:
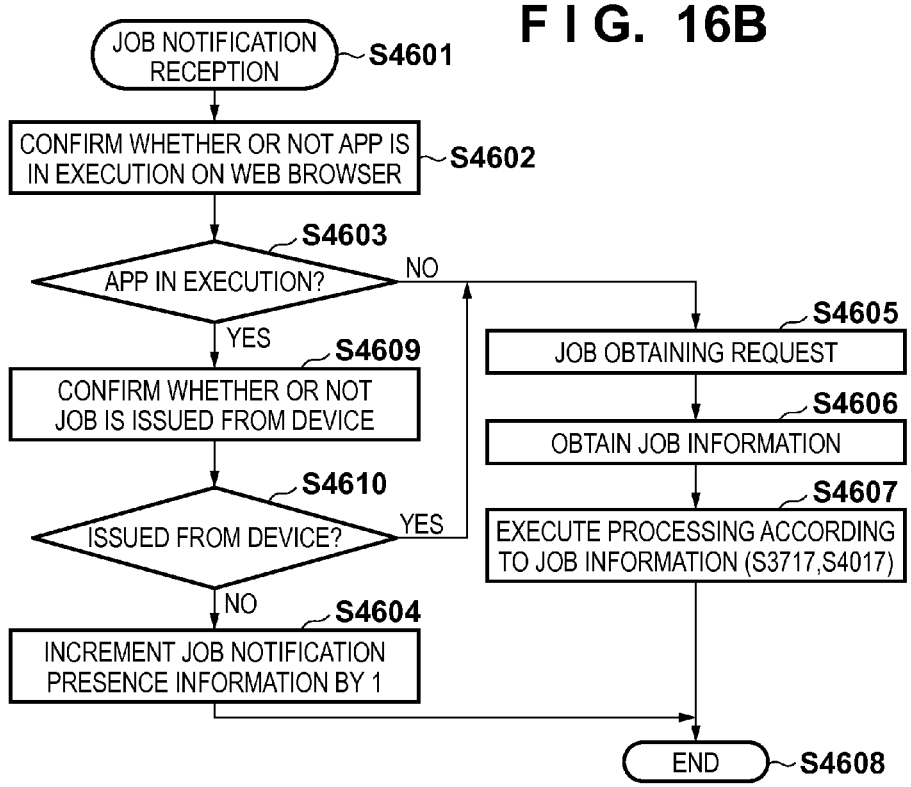

In step S3607, the MFP 3 transitions to a mode for excluding an externally input job, and permitting only acceptance of a job notification, and the process advances to step S3608. FIGS. 16A and 16B show job notification reception processing executed by the MFP 3 in this mode. In step S3608, the Web browser 27 of the MFP 3 requests the document creation APP 145 to transmit a home window. The document creation APP 145 transmits information of the home window to the MFP 3 in response to the request (step S3609). Then, the MFP 3 displays the received home window on the Web browser 27 (step S3608). When the user operates the Web browser 27 to start selection of a print target content (document) using the sub menu in the file menu 402, the Web browser 27 requests the document creation APP 145 to transmit the content (document) selection window (step S3610). The document creation APP 145 transmits information of the content (document) selection window to the MFP 3 in response to the request (step S3611). Then, the MFP 3 displays the content (document) selection window on the Web browser 27 (step S3610).

When the user presses the print menu 401 shown in FIG. 4 while selecting a content (document), the Web browser 27 requests the document creation APP 145 to transmit the print window 142 shown in FIG. 5 (step S3610). The document creation APP 145 transmits information of the print window 142 to the MFP 3 in response to the request (step S3611). Then, the MFP 3 displays the print window 142 on the Web browser 27 (step S3610). When the user presses the print button 534, the Web browser 27 issues a print request to the document creation APP 145 (step S3612). At this time, this print request includes information indicating that a host (request source) which issued this print request is the MFP (host=mfp), and information indicating that this print request does not require any job notification to the MFP 3 (notification=no). Note that the print request may also include other kinds of information such as information indicating a print target document.

Upon acceptance of the print request from the MFP 3, the document creation APP 145 issues a print job to the cloud print APP 146 (step S3613). At this time, the print request includes information indicating that a host which issued the print request of the print job is the MFP (host=mfp), and information indicating that this print request does not require any job notification to the MFP 3 (notification=no) according to the print request received from the MFP 3. The cloud print APP 146 inputs the print job to the print queue of the proxy APP 143 (step S3614).

At this time, the cloud print APP 146 further adds issued year/month/day/time information of the print job to the print job. The proxy APP 143 executes job registration processing shown in FIG. 11, and returns a job ID (print job ID) to the cloud print APP 146 (step S3615). Then, the proxy APP 143 enters a waiting state of a job obtaining request from the MFP 3 (step S3616).

The cloud print APP 146 returns the job ID (print job ID) returned from the proxy APP 143 to the document creation APP 145. Furthermore, in response to acceptance of the job ID from the cloud print APP 146, the document creation APP 145 notifies the MFP 3 of information indicating that the print job is issued. At this time, the document creation APP 145 notifies the MFP 3 of the job ID (print job ID) returned from the cloud print APP 146 together. This notification can be attained by utilizing, for example, the JavaScript® embedded in Web page information. At the issuance timing of the print job, the Web browser 27 executes a Print function, which is exported by the MFP 3 to the Web browser 27, via the JavaScript®.

When the Print function is called, the MFP 3 receives information representing that the print job is registered in the print queue. At this time, the job ID (print job ID) included in the received information is passed to the MFP 3 as an argument of the Print function, and the MFP 3 also obtains the job ID (print job ID) generated by the proxy APP 143 (step S3617). In this manner, since the MFP 3 includes the Print function, and the Web browser 27 utilizes the Print function via the JavaScript®, an unnecessary job notification can be omitted. As a result, reductions of the load on the server, the data traffic of the communication channel, and the data communication cost can be attained.

In step S3617, upon reception of information indicating that the print job has already been issued, the MFP 3 displays a message indicating that execution of print-related processing is in progress like "in print preparation" or "print in progress" on the display unit 21. Then, the MFP 3 notifies the user of transition to the print mode (print processing in progress). At this time, the MFP 3 displays this message without using the Web browser 27 so as to reduce the load. The MFP 3 waits for an elapse of an assumed time period (for example, about 3 sec) required for the image conversion APP 144 to complete image conversion (step S4306 in FIG. 13) (step S3618), and then issues a job obtaining request to the proxy APP 143 (step S3619). The proxy APP 143 executes job information return processing (FIG. 14), and returns the following print job information to the MFP 3 as a result of the processing (step S3620).

[Example of Print Job Information]
jobId: prn0004
dateTime: 20120814122435001
host: mfp
owner: chancy
deviceId: 77778888
ticketUri:
https://ske88funclub.com/print/ticket/prn001/ticket.xml
dataUri:
https://ske88funclub.com/print/data/prn001/data.jpg
status: queued When the proxy APP 143 does not return any print job information to the MFP 3 for the reason of incompletion of image conversion or the like in step S3620, the MFP 3 repeats the processes of steps S3618 and S3619 until print job information can be obtained or an error is determined after a prescribed retry count (for example, 100) is exceeded. The MFP 3 obtains a storage destination of a print setting file indicating print settings and that of a print image file from the print job information. A combination of the print setting file and print image file will be referred to as "print data" hereinafter. Also, the print setting file will also be referred to as a (print) job ticket. The print setting file is stored at a path (URI) designated by "ticketUri", and the print image file is stored at a path (URI) designated by "dataUri". The print setting file is stored in the HDD 202 in the PC 7, and the print image file is stored in the HDD 202 in the PC 5.

The MFP 3 obtains print data by accessing the paths designated by "ticketUri" and "dataUri" in the print job information. The MFP 3 executes print processing according to the contents of the print setting file and print image file, and then notifies the proxy APP 143 of completion of the print processing (step S3621). In step S3622, the proxy APP 143 executes job deletion processing (FIG. 21A), thus ending a series of processes related to that job (step S3623).

After completion of the print processing, the Web browser 27 of the MFP 3 requests the document creation APP 145 to transmit a home window (step S3624). The document creation APP 145 transmits information of the home window to the MFP 3 (step S3625). Then, the MFP 3 displays the home window on the Web browser 27 (step S3624). The MFP 3 waits for a user input operation (step S3626).

(Processing when Mobile Terminal Issues Print Instruction)

Figure 7A:
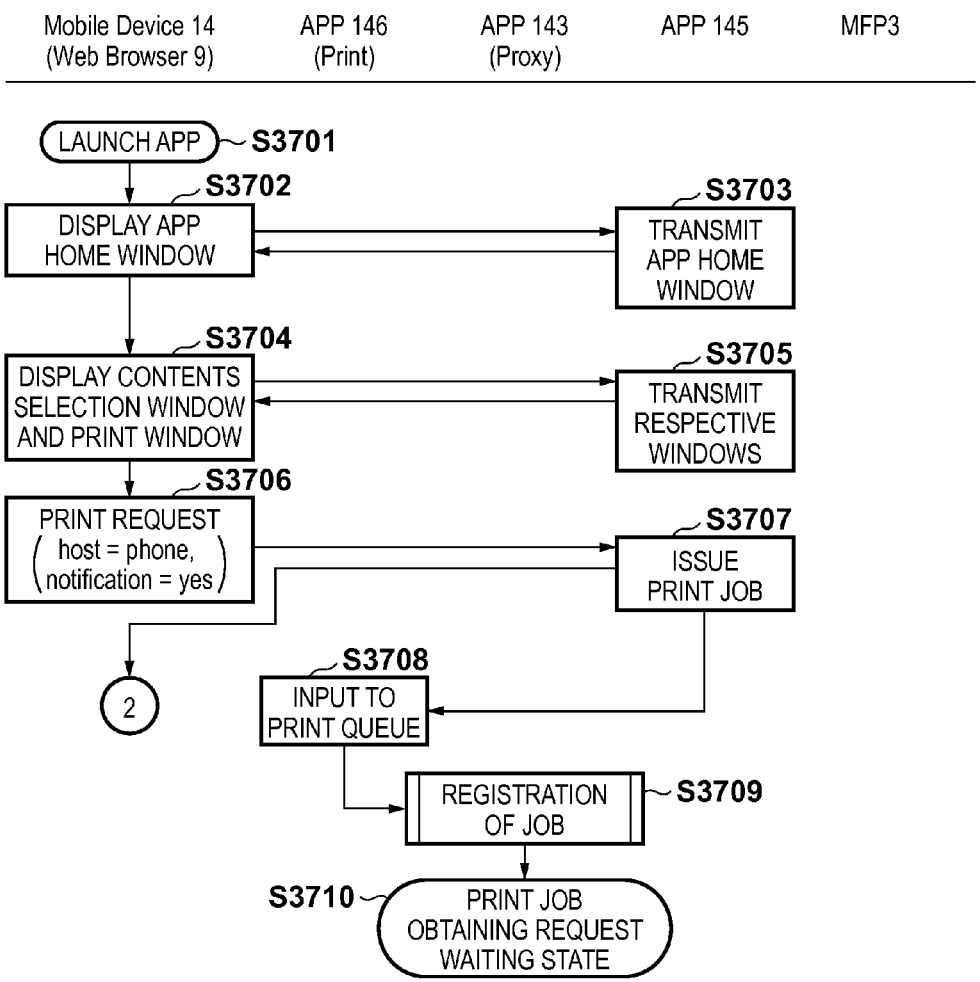
FIGS. 7A and 7B are flowcharts showing processing executed when a document creation APP is executed from a Web browser of a mobile terminal according to the first embodiment to execute print processing.
Figure 7B:
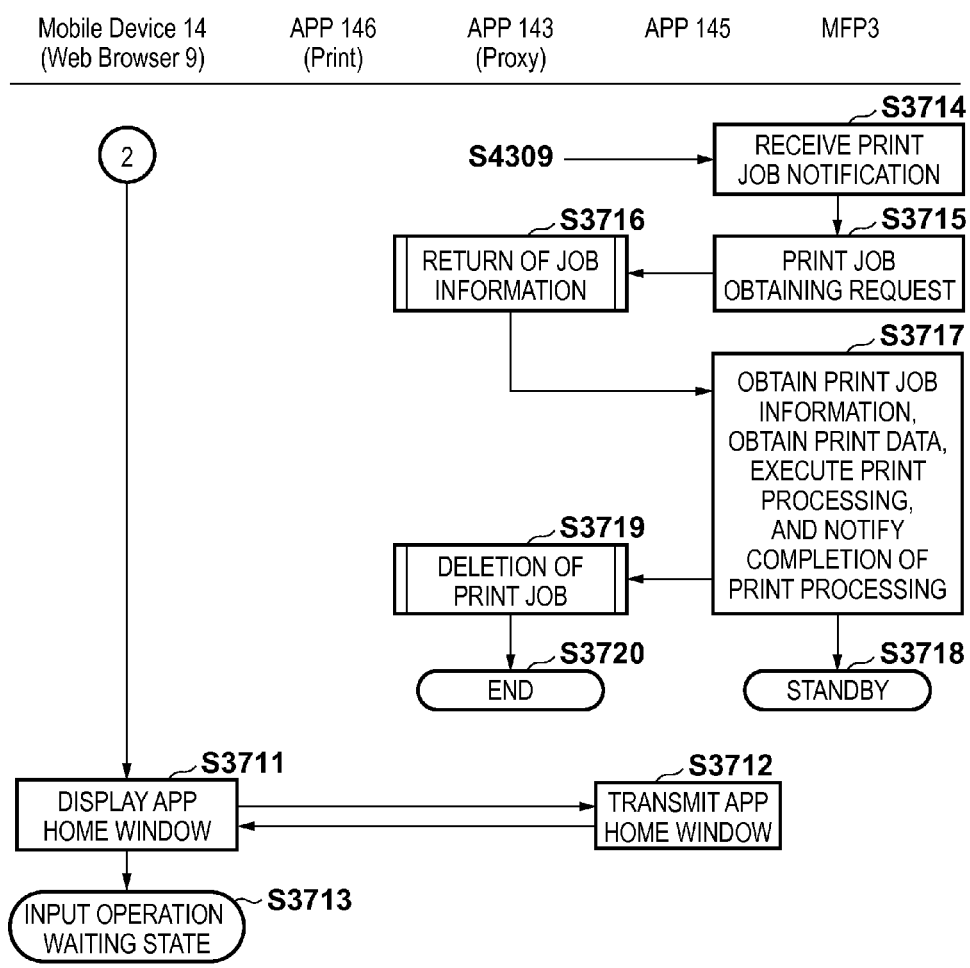

FIGS. 7A and 7B show an example of the flowchart showing processing executed when the document creation APP 145 is executed from the Web browser 9 of the mobile terminal 14 to execute a print operation. In FIGS. 7A and 7B, when the user launches the Web browser 9 of the mobile terminal 14 and requests it to execute the document creation APP 145, this processing sequence is started (step S3701). The Web browser 9 requests the document creation APP 145 to transmit a home window (step S3702). The document creation APP 145 transmits information of the home window to the mobile terminal 14 in response to the request (step S3703). Then, the mobile terminal 14 displays the home window on the Web browser 9 (step S3702). When the user operates the Web browser 9 and starts selection of a print target content (document) from the sub menu in the file menu 402, the Web browser 9 requests the document creation APP 145 to transmit a content (document) selection window (step S3704). The document creation APP 145 transmits information of the content (document) selection window to the mobile terminal 14 in response to the request (step S3705). Then, the mobile terminal 14 displays the content (document) selection window on the Web browser 9 (step S3704).

When the user presses the print menu 401 shown in FIG. 4 while selecting a content (document), the Web browser 9 requests the document creation APP 145 to transmit the print window 142 shown in FIG. 5 (step S3704). The document creation APP 145 transmits information of the print window 142 to the mobile terminal 14 in response to the request (step S3705). Then, the mobile terminal 14 displays the print window 142 on the Web browser 9 (step S3704).

When the user presses the print button 534 while selecting the device choice 536 (MFP 3), the Web browser 9 issues a print request to the document creation APP 145 (step S3706). At this time, the print request includes information indicating that a host (request source) which issued this print request is the mobile terminal 14 (host=phone), and information indicating that this print request requires a job notification to the MFP 3 (notification=yes). Note that the print request may also include other kinds of information such as information indicating a print target document.

Upon acceptance of the print request from the mobile terminal 14, the document creation APP 145 issues a print job to the cloud print APP 146 (step S3707). At this time, the print job includes information indicating that a host which issued the print request of the print job is the mobile terminal 14 (host=phone), and information indicating that the print request requires a job notification to the MFP 3 (notification=yes) according to the print request received from the mobile terminal 14. The cloud print APP 146 inputs the print job to the print queue of the proxy APP 143 (step S3708). At this time, the cloud print APP 146 further adds issued year/month/day/time information of the print job to the print job.

The proxy APP 143 executes job registration processing (FIG. 11), and returns a job ID (print job ID) to the cloud print APP 146 (step S3709). Then, the proxy APP 143 waits for a print job obtaining request from the MFP 3 (step S3710). The cloud print APP 146 returns the job ID (print job ID) returned from the proxy APP 143 to the document creation APP 145. Furthermore, when the Web browser 9 of the mobile terminal 14 receives a response of the print request issued to the document creation APP 145, it requests the document creation APP 145 to transmit a home window (step S3711). The document creation APP 145 transmits information of the home window to the mobile terminal 14 in response to the request (step S3712). Then, the mobile terminal 14 displays the home window on the Web browser 9 (step S3711). After that, the mobile terminal 14 waits for a user input operation (step S3713).

When the proxy APP 143 transmits a job notification to the MFP 3 (step S4309 in FIG. 13) and the MFP 3 receives the job notification (step S3714), the MFP 3 displays a message indicating that execution of print-related processing is in progress like "in print preparation" or "print in progress" on the display unit 21. Then, the MFP 3 notifies the user of transition to the print mode. At this time, the MFP 3 displays this message without using the Web browser 27. The MFP 3 issues a job obtaining request to the proxy APP 143 (step S3715). The proxy APP 143 executes job information return processing (FIG. 14), and returns the following print job information to the MFP 3 as a result of the processing (step S3716).

[Example of Print Job Information]
jobId: prn0001
dateTime: 20120814121812100
host: phone
owner: chancy
deviceId: 77778888
ticketUri: https://ske88funclub.com/print/ticket/prn001/ticket.xml
dataUri: https://ske88funclub.com/print/data/prn001/data.jpg
status: queued The MFP 3 obtains a storage destination of a print setting file which represents print settings and that of a print image file ("ticketUri" and "dataUri") from the print job information. The MFP 3 obtains print data by accessing paths (URIs) designated by "ticketUri" and "dataUri". The MFP 3 executes print processing according to the contents of the print setting file and print image file, and then notifies the proxy APP 143 of completion of the print processing (step S3717). In step S3719, the proxy APP 143 executes job deletion processing (FIG. 21A), thus ending a series of processes related to that job (step S3720). After completion of the print processing, the MFP 3 transitions to an online standby state (step S3718).

(Job Registration Processing)

Figure 9A:
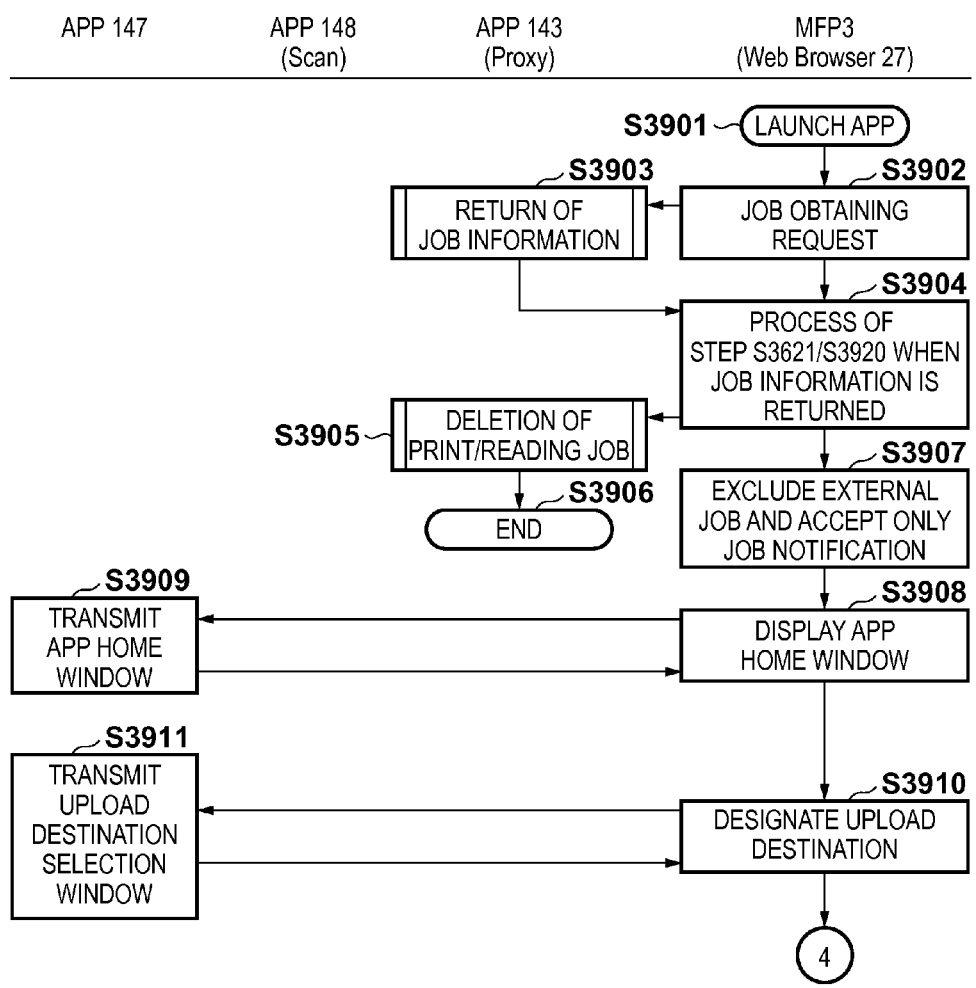
FIGS. 9A and 9B are flowcharts showing processing executed when a reading APP is executed from a Web browser of an MFP according to the third embodiment to read an original.
Figure 10A:
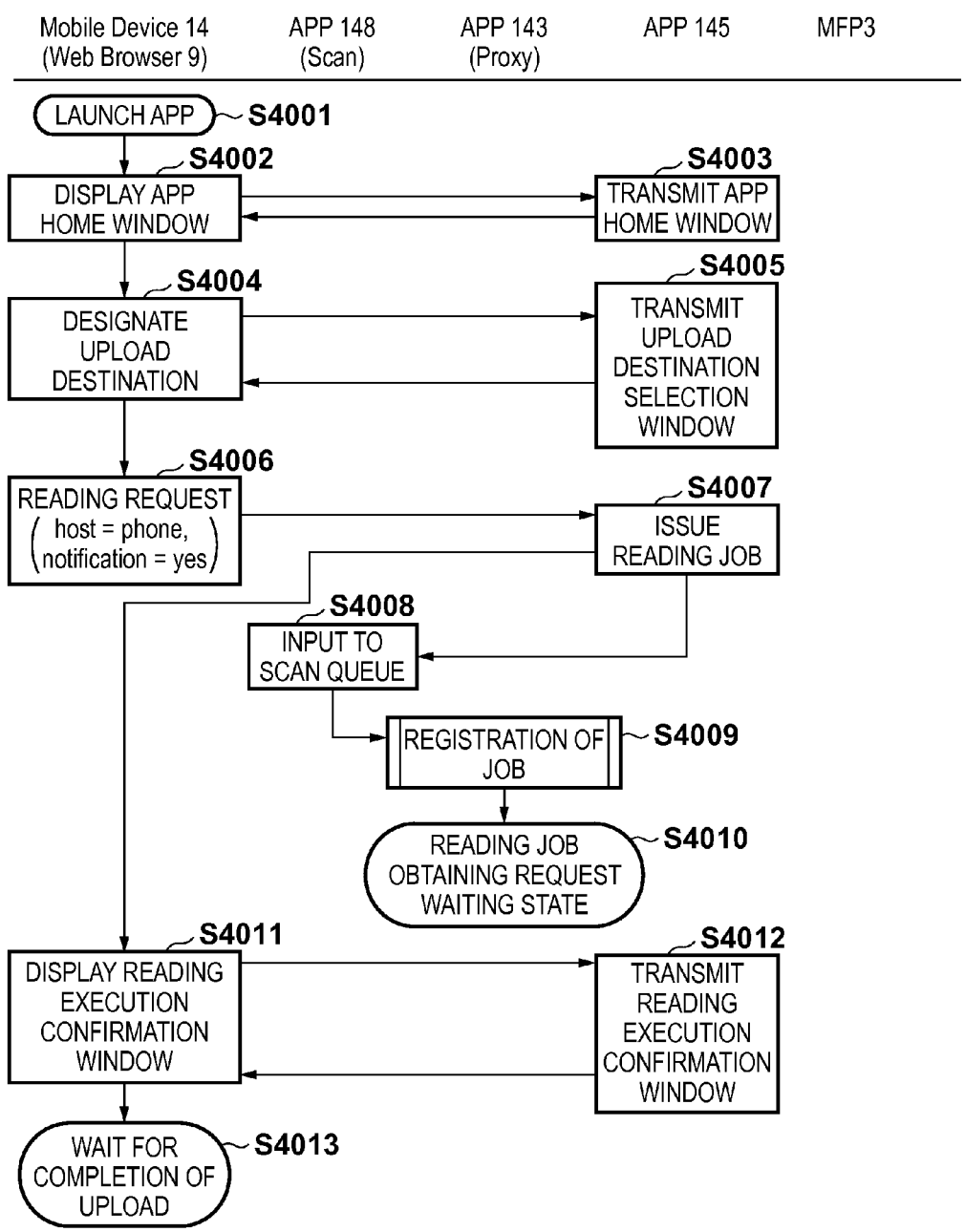
FIGS. 10A and 10B are flowcharts showing processing executed when a reading APP is executed from a Web browser of a mobile terminal according to the third embodiment to read an original.
Figure 10B:
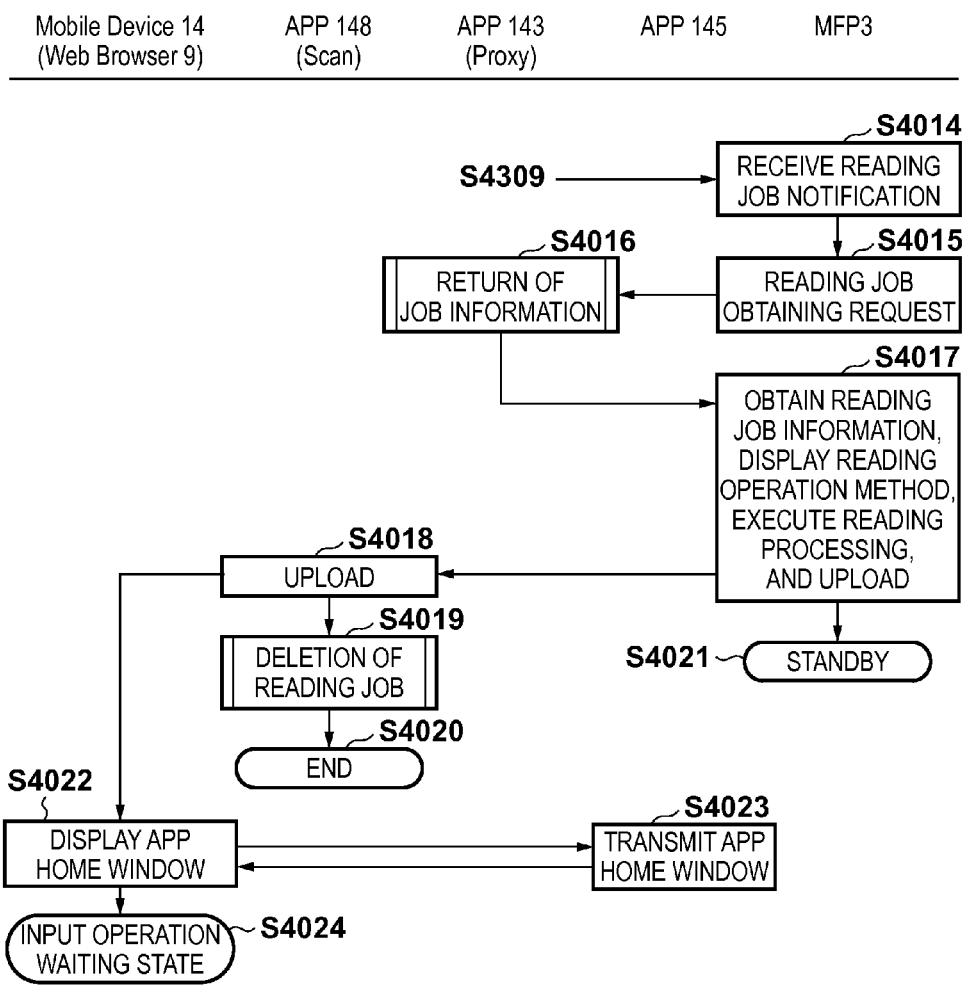
Figure 11:
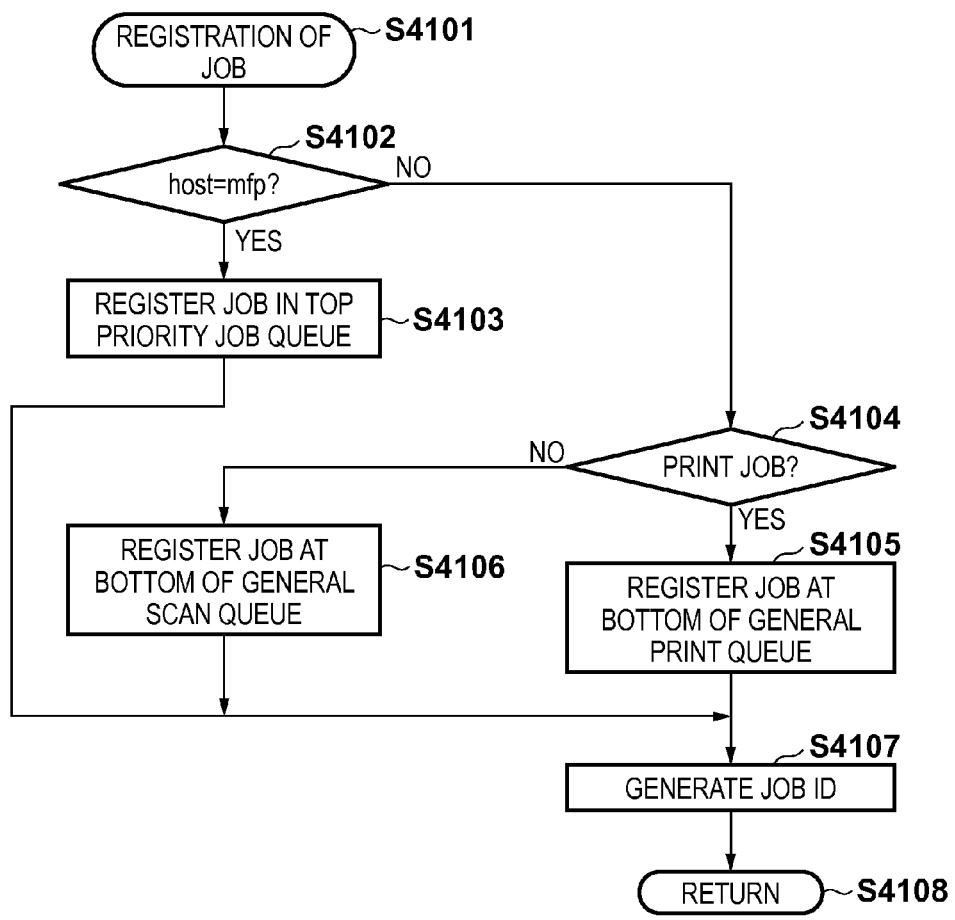
FIG. 11 is a flowchart showing job registration processing in a proxy APP according to the first embodiment.

FIG. 11 shows an example of the flowchart showing the job registration processing in the proxy APP 143. This processing corresponds to step S3615 in FIG. 6B, step S3709 in FIG. 7A, step S3815 in FIG. 8B, step S3915 in FIG. 9B, and step S4009 in FIG. 10A. Note that FIGS. 8A to 10B will be described in the second and third embodiments. In FIG. 11, when the job registration processing is requested, the proxy APP 143 starts the job registration processing (step S4101).

The proxy APP 143 confirms a type of a host as a job request source. If the proxy APP 143 determines that the host is the MFP (host=mfp) (YES in step S4102), the process advances to step S4103; if it determines that the host is other than the MFP (mobile terminal or PC) (NO in step S4102), the process advances to step S4104. In step S4103, the proxy APP 143 registers the job in the top priority job queue in the job queue shown in FIG. 18A, and saves respective pieces of information in a table which is required to store job information and is shown in FIG. 19A or 19B.

In step S4104, the proxy APP 143 confirms a job type. If the proxy APP 143 determines that the job is a print job (YES in step S4104), the process advances to step S4105; if it determines that the job is other than a print job (reading job) (NO in step S4104), the process advances to step S4106. In step S4105, the proxy APP 143 registers the job at the bottom position of a general print queue in the job queue shown in FIG. 18A, and saves respective pieces of information in the table which is required to store job information of the print job and is shown in FIG. 19A. In step S4106, the proxy APP 143 registers the job in a general scan queue in the job queue shown in FIG. 18A, and saves respective pieces of information in the table which is required to store job information of the reading job and is shown in FIG. 19B. In step S4107, the proxy APP 143 generates a job ID (print job ID or reading job ID). In step S4108, the proxy APP 143 returns the generated job ID to a call source of this processing, thus ending this processing sequence (step S4108).

(Job Notification Processing)

FIG. 13 shows an example of the flowchart showing the job notification processing in the proxy APP 143. The proxy APP 143 is always active, executes the processing shown in FIG. 13 in turn for devices (MFP and the like) as management/control targets, and transmits a job notification (print job notification or reading job notification) to the target device as needed. FIG. 13 shows the processing after a target device is specified. A case will be exemplified below wherein the MFP 3 is specified as the target device.

When the proxy APP 143 specifies the target device (MFP 3 in this case) and requests job notification processing, the processing shown in FIG. 13 is started (step S4301). The proxy APP 143 confirms a status of the device (step S4302). If the proxy APP 143 determines that the device status is "online" (YES in step S4303), the process advances to step S4304; otherwise (NO in step S4303), the process jumps to step S4310. In step S4304, the proxy APP 143 confirms the presence/absence of a print job of the MFP 3 with reference to the job queue shown in FIG. 18A. If the proxy APP 143 determines that the print job is present (YES in step S4304), the process advances to step S4305; otherwise (NO in step S4304), the process jumps to step S4307.

In step S4305, the proxy APP 143 requests the image conversion APP 144 to execute image conversion processing related to the print job. The image conversion APP 144 converts a print target image into a file format (JPEG file in this case) printable by the MFP 3 according to the image conversion request from the proxy APP 143 (step S4306). The print target image corresponds to a print target content or a PDF file generated for print processing, which is temporarily stored in the HDD 202 by the document creation APP 145. After completion of the image conversion processing by the image conversion APP 144, the proxy APP 143 refers to detailed information of the print job shown in FIG. 19A using the job ID of the print job being processed as a key so as to confirm if a job notification is required. If the proxy APP 143 determines that a job notification is required (notification=yes) (YES in step S4308), the process advances to step S4309; otherwise (notification=no) (NO in step S4308), the process jumps to step S4310. In step S4308, the proxy APP 143 saves the determination result in the table which is required to store job information and is shown in FIG. 19A or 19B.

In step S4307, the proxy APP 143 refers to the job queue shown in FIG. 18A to confirm the presence/absence of a reading job of the MFP 3. If the proxy APP 143 determines that the reading job is present (YES in step S4307), the process advances to step S4308; otherwise (NO in step S4307), the process jumps to step S4310. In step S4309, the proxy APP 143 transmits a job notification (print job notification or reading job notification) to the MFP 3. After that, the proxy APP 143 ends this processing sequence (step S4310).

(Job Information Return Processing)

Figure 14:
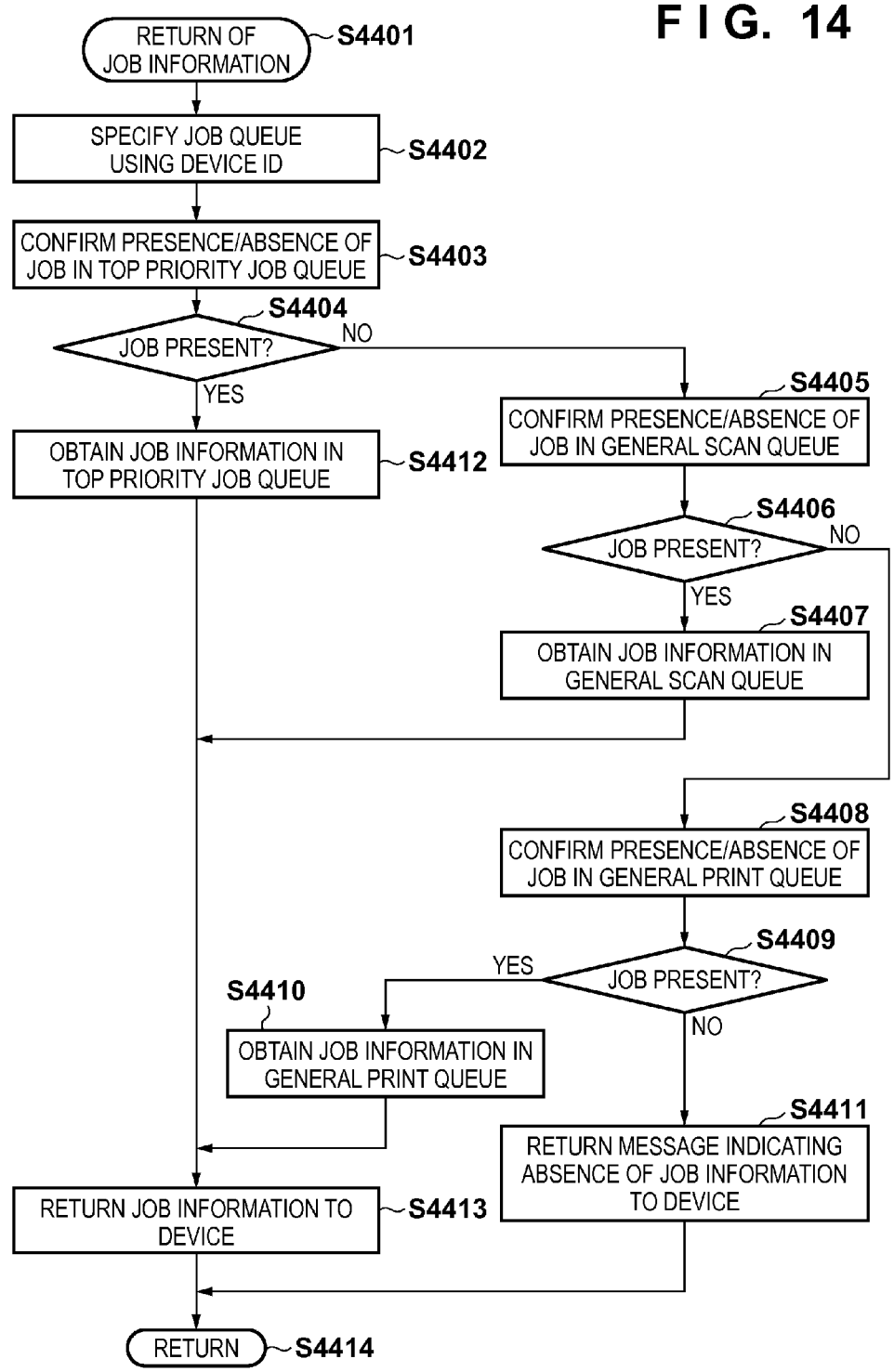
FIG. 14 is a flowchart showing job information return processing in the proxy APP according to the first embodiment.

FIG. 14 shows an example of the flowchart showing the job information return processing in the proxy APP 143. This processing corresponds to step S3620 in FIG. 6B, step S3719 in FIG. 7B, step S3919 in FIG. 9B, and step S4016 in FIG. 10B. FIGS. 9A, 9B, 10A, and 10B will be described in the third embodiment.

In FIG. 14, when job information return processing is requested from a device (MFP 3 in this case), the proxy APP 143 starts the job information return processing (step S4401). The proxy APP 143 specifies a job queue of a target device using a device ID included in job information (step S4402). Then, the proxy APP 143 confirms the presence/absence of a job in a top priority job queue in the specified job queue (step S4403). As an example of the job queue, FIG. 18A, 18C, or 18D is used. If the proxy APP 143 determines that a job is present in the top priority job queue (YES in step S4404), the process advances to step S4412; otherwise (NO in step S4404), the process advances to step S4405.

In step S4412, the proxy APP 143 obtains job information registered at the head position in the top priority job queue, and the process advances to step S4413. In step S4405, the proxy APP 143 confirms the presence/absence of a job in a general scan queue. If the proxy APP 143 determines that a job is present in the general scan queue (YES in step S4406), the process advances to step S4407; otherwise (NO in step S4406), the process jumps to step S4408. In step S4407, the proxy APP 143 obtains job information registered at the head position in the general scan queue, and the process advances to step S4413. In step S4408, the proxy APP 143 confirms the presence/absence of a job in a general print queue. If the proxy APP 143 determines that a job is present in the general print queue (YES in step S4409), the process advances to step S4410; otherwise (NO in step S4409), the process advances to step S4411.

In step S4410, the proxy APP 143 obtains job information registered at the head position in the general print queue, and the process advances to step S4413. In step S4411, since there is no job in the job queue of the target device, the proxy APP 143 returns a message indicating the absence of job information to the device as the request source. Then, the process returns to the processing sequence as a call source of this processing (step S4414). In step S4413, the proxy APP 143 returns the job information obtained in step S4412, S4407, or S4410 to that device. Then, the process returns to the processing sequence as a call source of this processing (step S4414).

(Job Notification Reception Processing)

FIGS. 16A and 16B show examples of the flowcharts showing the job notification reception processing in the MFP 3. This processing is executed in correspondence with the mode set in step S3607 in FIG. 6A. The first embodiment will explain the processing shown in FIG. 16A. Note that "job notification presence information" used in this processing is information indicating a state in which the MFP 3 receives a job notification and has not executed processing for a job associated with that job notification yet. The job notification presence information is saved in the RAM 17 in the MFP 3, and the MFP 3 initializes this information by setting "0" in the information when it is turned on.

Upon reception of a job notification issued from the proxy APP 143, the MFP 3 starts the job notification reception processing (step S4601) in FIG. 16A. The MFP 3 confirms whether or not an application is in execution on the Web browser 27 (step S4602). If the MFP 3 determines that the application is in execution on the Web browser 27 (YES in step S4603), the process advances to step S4604; otherwise (NO in step S4603), the process advances to step S4605. Note that when the MFP 3 launches the Web browser 27 but no application is executed, it is determined in step S4603 that the Web browser is running, and that the application is in execution on the Web browser 27.

In step S4604, the MFP 3 increments the job notification presence information by "1", and saves it in the RAM 17. Then, the MFP 3 ends this processing sequence (step S4608). In step S4605, the MFP 3 issues a job obtaining request to the proxy APP 143. At this time, the proxy APP 143 executes the job information return processing (FIG. 14) in response to the job obtaining request from the MFP 3, and returns the result of the processing to the MFP 3. In step S4606, the MFP 3 receives the following print job information or reading job information from the proxy APP 143, and the process advances to step S4607.

[Example of Print Job Information]
jobId: prn0001
dateTime: 20120814121812100
host: phone
owner: chancy
deviceId: 77778888
ticketUri:
https://ske88funclub.com/print/ticket/prn001/ticket.xml
dataUri:
https://ske88funclub.com/print/data/prn001/data.jpg
status: queued
[Example of Reading Job Information]
jobId: scn0304
dateTime: 20120814122045250
host: phone
owner: akb88
deviceId: 77778888
ticketUri:
https://ske88funclub.com/scan/ticket/scn0304/ticket.xml
uploadUri:
https://storageservice.xxx/user/akb88/private/
temporaryUploadUri:
https://ske88funclub.com/scan/data/scn0304/
status: queued In step S4607, the MFP 3 executes print processing or reading processing in step S3717 in FIG. 7B or step S4017 in FIG. 10B in accordance with the job information obtained in step S4606. Then, the MFP 3 ends this processing sequence (step S4608). Every time the print processing or reading processing is complete, the MFP 3 decrements the value of the job notification presence information, and saves it in the RAM 17. Note that the MFP 3 sets the job notification presence information in an integer range not less than 0.

(Job Confirmation Processing)

Figure 17:
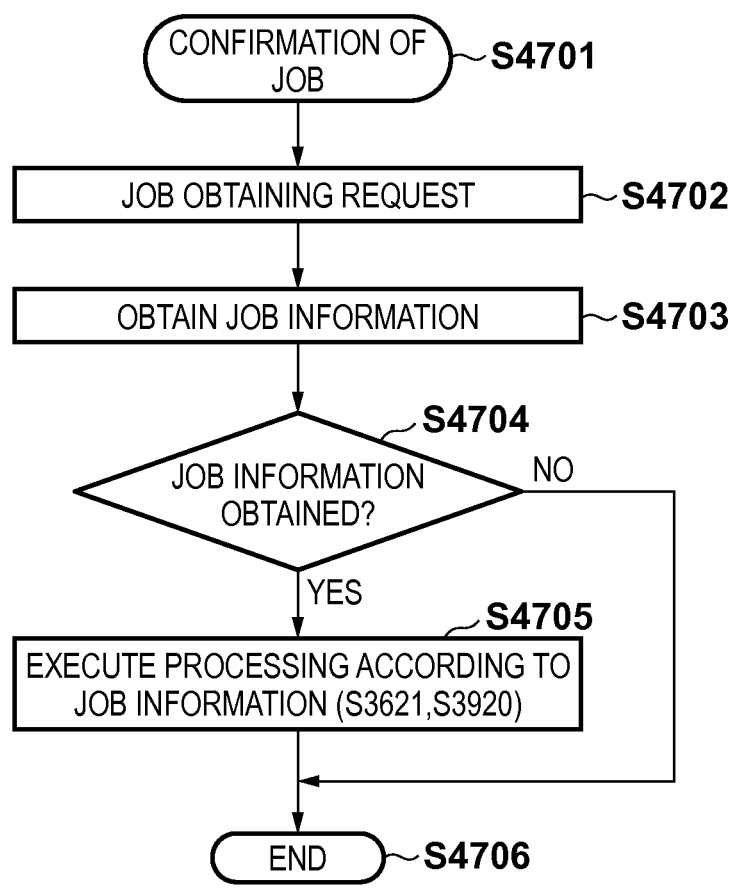
FIG. 17 is a flowchart showing job confirmation processing in an MFP.

FIG. 17 shows an example of the flowchart showing the job confirmation processing in the MFP 3. In FIG. 17, when job confirmation processing is requested, the MFP 3 starts the job confirmation processing (step S4701). The MFP 3 issues a job obtaining request to the proxy APP 143 (step S4702). Then, the MFP 3 obtains job information transmitted in response to the job obtaining request (step S4703). If the job information can be obtained (YES in step S4704), the process advances to step S4705; otherwise (NO in step S4704), this processing sequence ends (step S4706). Note that the job information can be obtained, for example, when the proxy APP 143 returns the job information to the MFP 3 in step S4413 in FIG. 14. On the other hand, the job information cannot be obtained, for example, when the proxy APP 143 returns a message indicating the absence of job information to the MFP 3 in step S4411 in FIG. 14. The job information obtained by the MFP 3 in step S4703 is print job information or reading job information like the following examples.

Figure 9B:
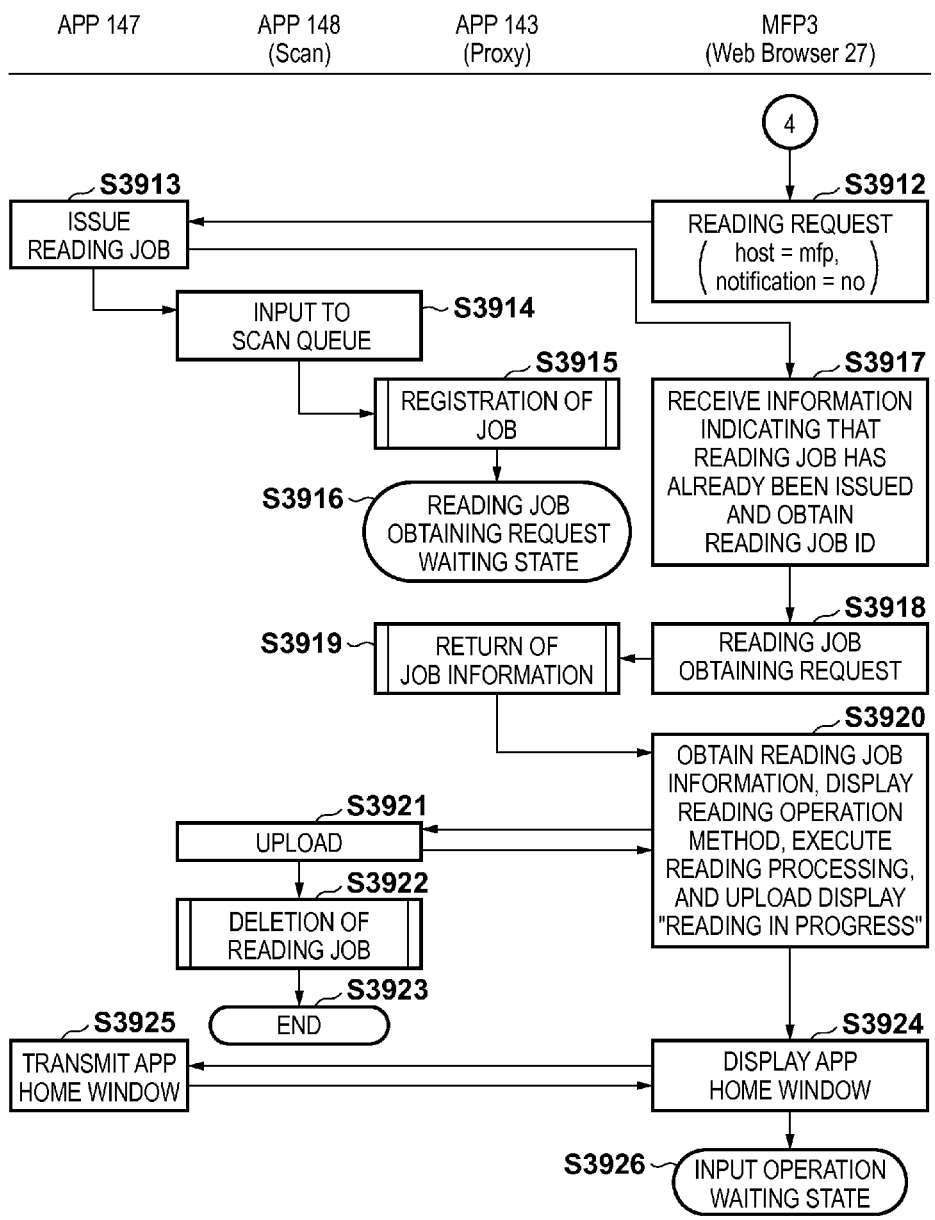

[Example of Print Job Information]
jobId: prn0004
dateTime: 20120814122435001
host: mfp
owner: chancy
deviceId: 77778888
ticketUri:
https://ske88funclub.com/print/ticket/prn0004/ticket.xml
dataUri:
https://ske88funclub.com/print/data/prn0004/data.jpg
status: queued
[Example of Reading Job Information]
jobId: scn0306
dateTime: 20120814122423008
host: mfp
owner: chancy
deviceId: 77778888
ticketUri:
https://ske88funclub.com/scan/ticket/scn0306/ticket.xml
uploadUri:
https://storageservice.xxx/user/chancy/private/
temporaryUploadUri:
https://ske88funclub.com/scan/data/scn0306/
status: queued In step S4705, the MFP 3 executes print processing or reading processing in step S3621 in FIG. 6B or step S3920 in FIG. 9B according to the job information obtained in step S4703. Then, the MFP 3 ends this processing sequence (step S4706). The MFP 3 executes the job confirmation processing (FIG. 17) in, for example, the following cases.

Figure 8A:
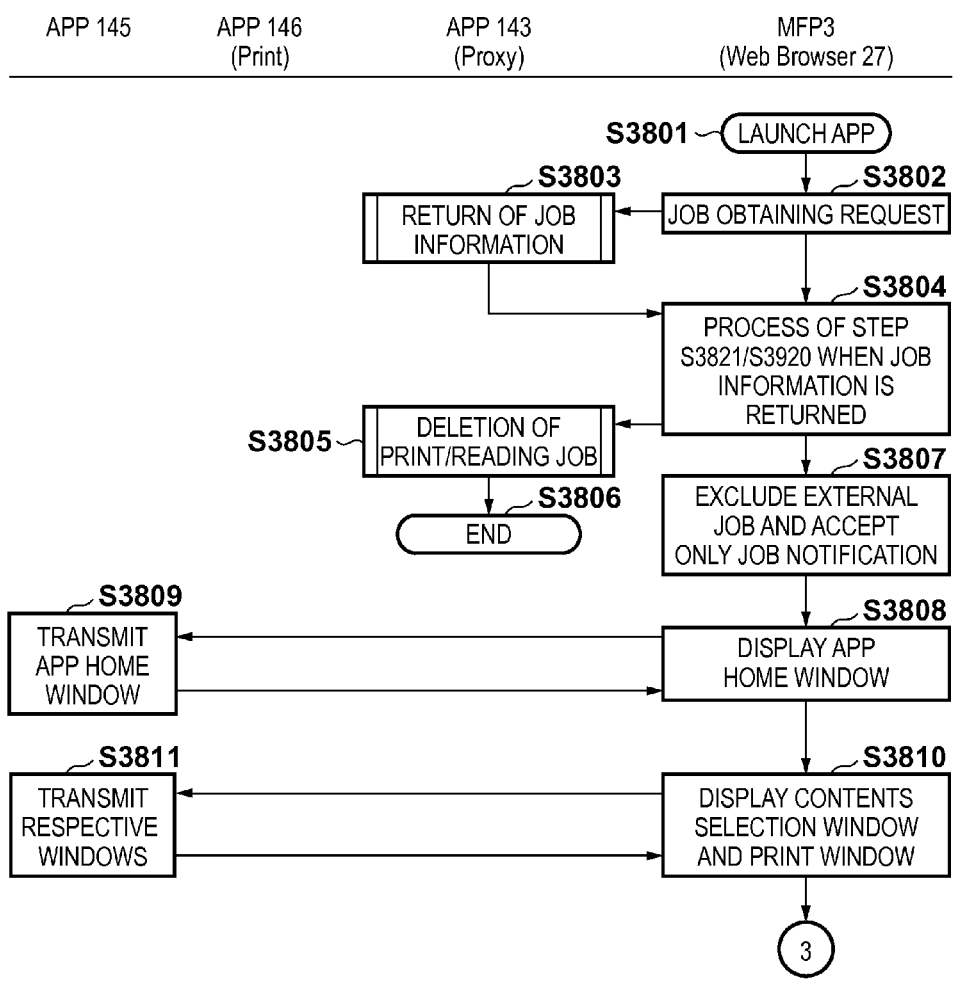
FIGS. 8A and 8B are flowcharts showing processing executed when a document creation APP is executed from a Web browser of an MFP according to the second embodiment to execute print processing.
Figure 8B:
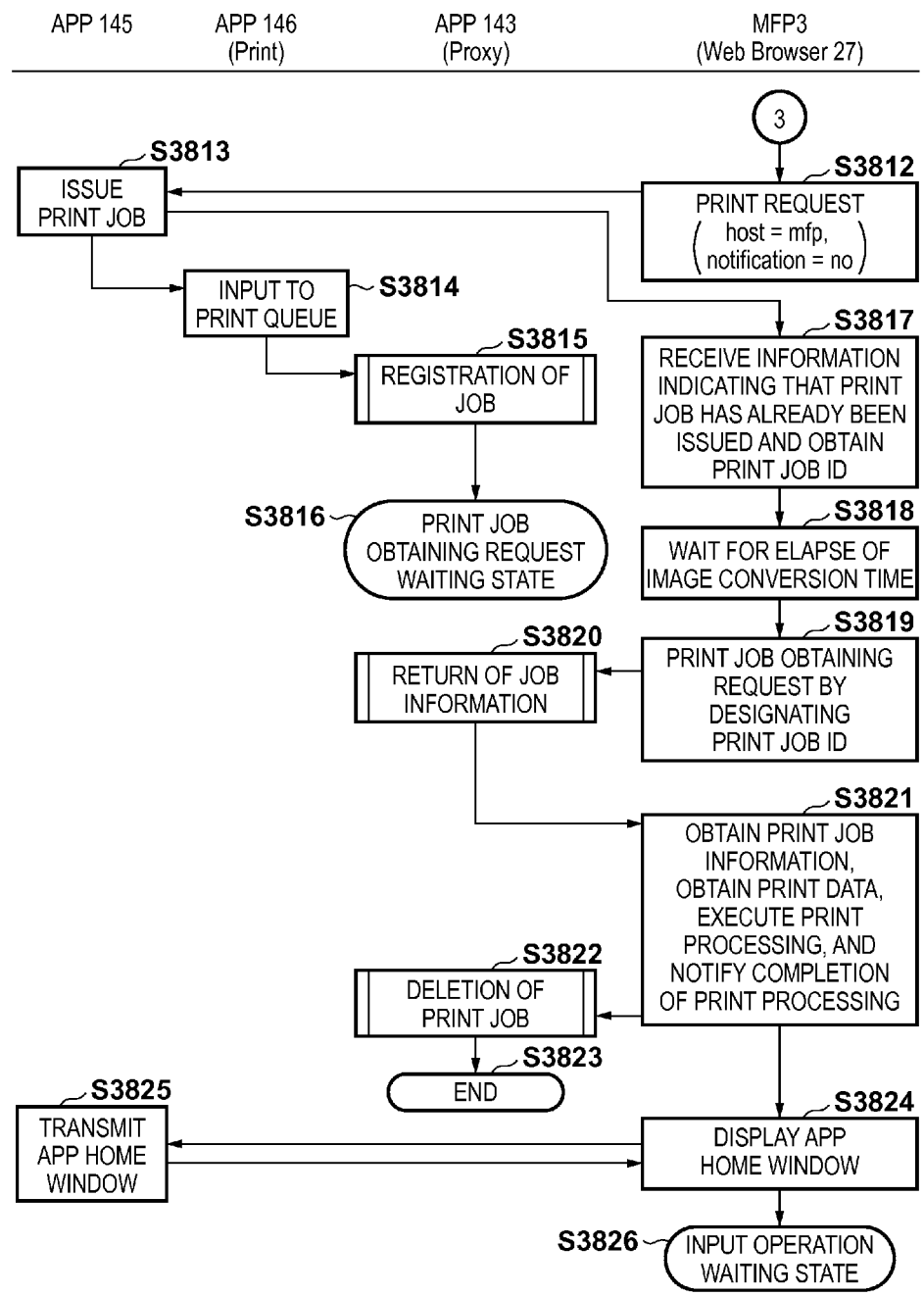

(1) When the control transitions to a state of step S3626 in FIG. 6B (input operation waiting state)
(2) When the control transitions to a state of step S3718 in FIG. 7B (standby state)
(3) When the control transitions to a state of step S3826 in FIG. 8B (input operation waiting state)
(4) When the control transitions to a state of step S3926 in FIG. 9B (input operation waiting state)
(5) When the control transitions to a state of step S4021 in FIG. 10B (standby state)
(6) When the MFP is turned on
(7) When the MFP returns to the standby state after a copy, print, reading operation or the like
(8) When the ink head or ink cartridge is exchanged
(9) When the MFP quits the Web browser, and displays a home window of the MFP on the display unit
(10) When the MFP restores from a warning state
(11) When the MFP restores from an error state.

Note that states in FIGS. 8A to 10B will be described in the second and third embodiments.

In all the cases except for (6), when the job notification presence information is larger than "0", the MFP 3 repetitively executes the job confirmation processing (FIG. 17). For example, when the user selects a plurality of documents in step S3610 in FIG. 6A and prints these documents at the same time, the document creation APP 145 may issue and process a plurality of print jobs corresponding to the respective documents to the cloud print APP 146 in one method. When a plurality of print jobs are simultaneously issued by such method, and when the job notification presence information is larger than "0", the MFP 3 repetitively executes the job confirmation processing (FIG. 17). Thus, the plurality of print jobs issued simultaneously can be sequentially processed in a series of processes. Hence, the plurality of print jobs issued via the MFP can be preferentially processed and printed without being interrupted by a job issued from another apparatus.

(Configuration Example of Job Queue)

FIGS. 18A to 18D show configuration examples of job queues in the proxy APP 143. A job queue is configured by a general database. In FIGS. 18A to 18D, a job ID with "prn" is that of a print job, a job ID with "scn" is that of a reading job, and the proxy APP 143 generates these job IDs. As for "issued year/month/day/time" will be explained in association with an example of a job ID "prn0004" shown in FIG. 18A. The "issued year/month/day/time" of this job ID indicates that this print job was issued at 12:24:35 1/1000, Aug. 14, 2012. For example, the "issued year/month/day/time" will be described in association with an example of a job ID "scn0304" shown in FIG. 18A. The "issued year/month/day/time" indicates that this reading job was issued at 12:20:45 250/1000, Aug. 14, 2012.

The job queue in FIG. 18A is configured by three types of queues, that is, a top priority job queue, general scan queue, and general print queue, and the first, second, and third priorities are set in turn for the top priority job queue, general scan queue, and general print queue. In this embodiment, assume that either a reading job or print job can be registered in the top priority job queue. Note that the top priority job queue will also be described as a first job queue, and the general scan queue and general print queue will also be described as second job queues for the sake of convenience. The top priority job queue has a size for one job, and the sizes of the general scan queue and general print queue have no limit. The job queue in FIG. 18B is configured by only one job queue, and the first priority and a size without any limit are set. The job queue in FIG. 18C is the same as that in FIG. 18A, and in this example, states of registered jobs are different. The job queue in FIG. 18D is configured by a top priority job queue, general scan queue, and general print queue, and the first, second, and third priorities are respectively set in turn for the top priority job queue, general scan queue, and general print queue. Also, sizes of the top priority job queue, general scan queue, and general print queue have no limit. The reason why the first, second, and third priorities are set in turn for the top priority job queue, general scan queue, and general print queue in FIGS. 18A, 18C, and 18D is to consider the user's operability.

In this case, a job issued from the application when the user operates the Web browser (Web browser 27) of the device (MFP 3) to input a print or reading processing instruction is determined as a top priority job to give the top priority to the operability of the user who operates the MFP 3. Next, in order to prevent an operation for setting an original on the MFP and executing reading processing by operating a start button on an operation panel (operation unit 20) of the MFP by the user from being interrupted by another job, the second priority is given to the general scan queue. Thus, a reading job issued from the application when the user operates the mobile terminal 14 or the like can be preferentially processed, thus improving the user's operability.

Then, the third priority (lowest priority) is given to the general print queue of these queues. Normally, print processing of a print job issued from the application when the user operates the mobile terminal 14 or the like is automatically executed by the MFP 3 without requiring any user operation. For example, a job registered in the top priority job queue or general scan queue requires a user's MFP operation. By contrast, a job registered in the general print queue normally does not require any user's MFP operation (except for an out-of-paper or out-of-ink state). For this reason, even when the third priority is given to the general print queue, the user's operability is rarely impaired. Note that the aforementioned priority order is an example, and the priorities of the general scan queue and general print queue may be set to be reversed in correspondence with the intended use of the user.

(Table Configuration of Job Information)

FIGS. 19A and 19B show configuration examples of tables required to store job information of a job registered in the job queue in the proxy APP 143. FIG. 19A shows a table for a print job, and FIG. 19B shows a table for a reading job. These tables are stored in a general database. Common information stored in the tables shown in FIGS. 19A and 19B includes an issued year/month/day/time, host, owner name, device ID, job ticket path (URI), status, presence/absence of job notification necessity, and job priority order. However, even for information of the same item, different values may be set in statuses of a print job and reading job. Information stored in only the table shown in FIG. 19A includes a print image data path (URI). Information stored in only the table shown in FIG. 19B includes an upload destination path (URI) and temporary upload destination path (URI).

(Display Window Example Related to Reading Processing)

Figure 20A:
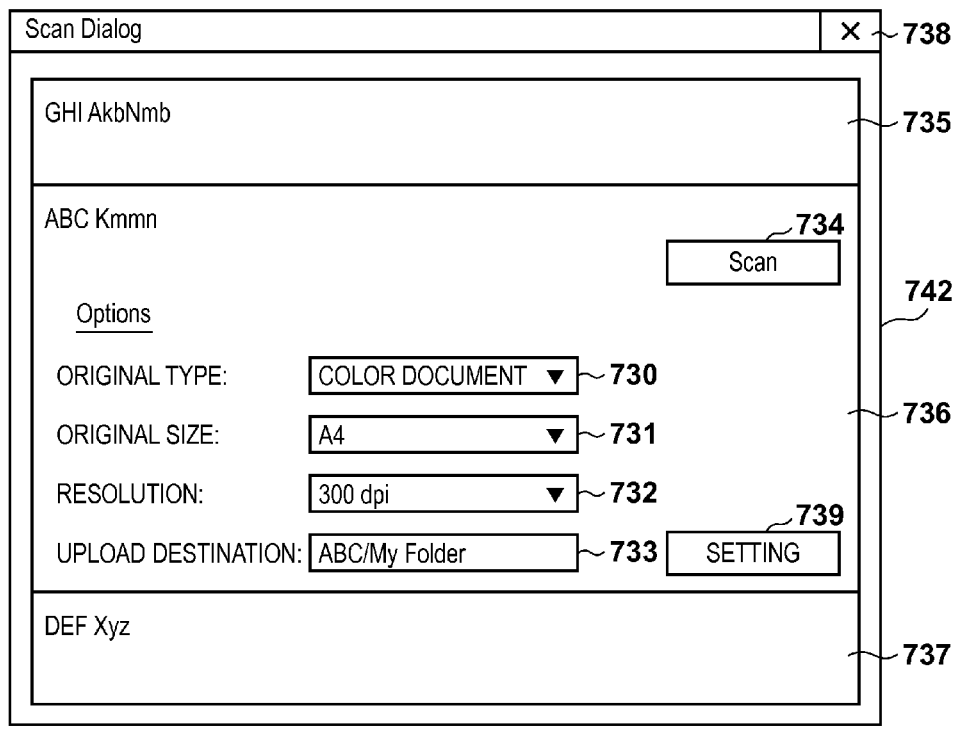
FIGS. 20A and 20B are views showing examples of a window and upload destination selection window provided by a reading APP.
Figure 20B:
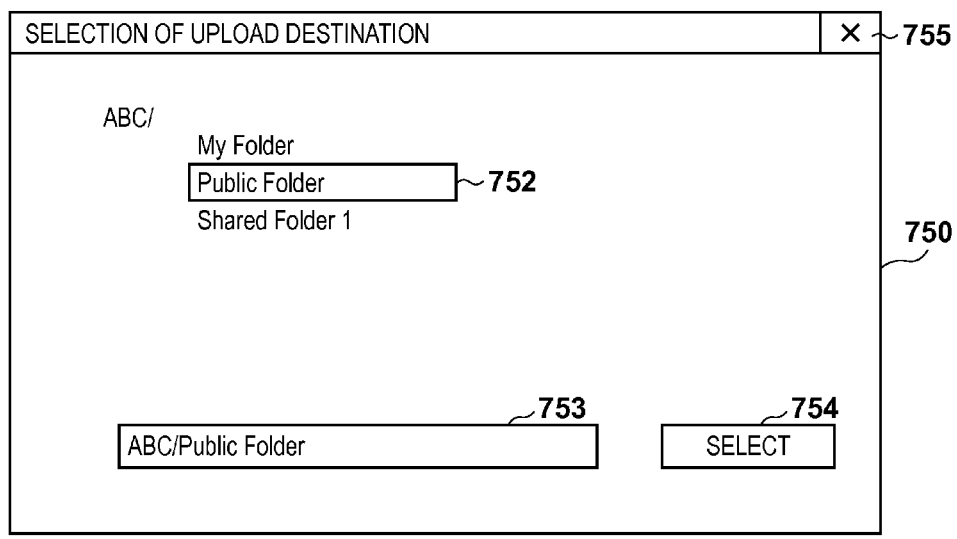

FIGS. 20A and 20B show examples of a home window 742 and upload destination selection window 750. FIG. 20A shows an example of the home window 742. In FIG. 20A, the home window 742 is controlled by the reading APP 147 as a reading setting window for the MFP 3 or 103 with respect to the user. The reading APP 147 transmits information of the home window 742 to the mobile terminal 14, PC 1, or MFP 3 or 103. The mobile terminal 14, PC 1, or MFP 3 or 103 receives the transmitted information of the window, and displays the window by the Web browser 9, 25, 27, or 28. In this manner, the home window 742 is displayed on the Web browser 9, 25, 27, or 28.

Device choices 735, 736, and 737 are those of selectable devices. The device choices 735, 736, and 737 respectively represent those corresponding to an MFP with a model name AkbNmb available from Company GHI, an MFP with a model name Kmmn available from Company ABC (corresponding to the MFP 3 of this embodiment), and an MFP with a model name Xyz available from Company DEF. FIG. 20A illustrates a state in which the device choice 736 which represents the MFP 3 is selected. For example, when the home window 742 is displayed on the Web browser 27 of the MFP 3, the reading APP 147 transmits information required to display the device choice 736 alone to the MFP 3, so as not to allow the user to select other devices. On the other hand, when the home window 742 is displayed on the Web browser 9 of the mobile terminal 14 or the Web browser 25 in the PC 1, the reading APP 147 transmits information required to display the device choices 735, 736, and 737 to the mobile terminal 14 or PC 1. Then, the mobile terminal 14 or PC 1 displays the window on the Web browser 9 or 25 based on the received information. Thus, when the user operates the Web browser 9 or 25 of the mobile terminal 14 or PC 1, the reading APP 147 controls to allow that user to select all devices.

Using an original type selection part 730, a type of an original to be read by the MFP 3 is selected from the following options according to a user operation. FIG. 20A illustrates a state in which "color document" is selected. Note that original type options include "color photo", "monochrome photo", "color document", "monochrome document", and the like. Using an original size selection part 731, a size of an original to be read by the MFP 3 is selected from the following options according to a user operation. FIG. 20A illustrates a state in which "A4" is selected. Note that original size options include "A5", "A4", "B5", "Letter", and the like. Using a resolution selection part 732, a resolution to be read by the MFP 3 is selected from the following options according to a user operation. FIG. 20A illustrates a state in which "300 dpi" is selected. Note that resolution options include "150 dpi", "300 dpi", "600 dpi", and the like. The number of selectable items of the aforementioned options may be increased/decreased according to functions of the respective devices.

An upload destination display part 733 displays an upload destination of an image read by the MFP 3. An upload destination setting button 739 accepts a display instruction of the upload destination selection window 750 shown in FIG. 20B. Upon pressing of the upload destination setting button 739 by a user operation, the reading APP 147 displays the upload destination selection window 750. A reading button 734 accepts a reading start instruction. Upon pressing of the reading button 734 by a user operation, the reading APP 147 generates a reading job for the MFP 3 associated with the device choice 736, and issues that reading job to the cloud scan APP 148. A close button 738 accepts a close instruction of the home window 742. Upon pressing of the close button 738 by a user operation, the reading APP 147 closes the home window 742.

FIG. 20B shows an example of the upload destination selection window 750. In FIG. 20B, the upload destination selection window 750 is provided by the reading APP 147 as an upload destination selection window of an image read by the MFP 3 or 103 with respect to the user. The reading APP 147 transmits information of the upload destination selection window 750 to the mobile terminal 14, PC 1, or MFP 3 or 103. Then, the mobile terminal 14, PC 1, or MFP 3 or 103 receives that information, and displays the upload destination selection window 750 on the Web browser 9, 25, 27, or 28. In this manner, the upload destination selection window 750 is displayed on the Web browser using the Web browser 9, 25, 27, or 28.

Using a folder designation part 752, the user can designate a folder of an upload destination of an image read by the MFP 3 or 103 from tree-displayed folders. FIG. 20B illustrates a state in which "ABC/Public Folder" is selected. A folder display part 753 displays a full path of a folder designated by the user. Upon pressing of a selection button 754 by a user operation, the reading APP 147 settles the folder displayed in the folder display part 753 as an upload destination of an image read by the MFP 3 or 103, and closes the upload destination selection window 750. A close button 755 accepts a close instruction of the upload destination selection window 750. Upon pressing of the close button 755 by a user operation, the reading APP 147 closes the upload destination selection window 750.

(Deletion Processing)

FIGS. 21A and 21B show examples of the flowcharts showing the deletion processing of a print job in the proxy APP 143 and that of a reading job in the cloud scan APP 148. FIG. 21A shows an example of the flowchart showing the deletion processing of a print job in the proxy APP 143. This processing corresponds to step S3622 in FIG. 6B, step S3719 in FIG. 7B, and step S3822 in FIG. 8B. FIG. 21B shows an example of the flowchart showing the deletion processing of a reading job in the cloud scan APP 148. This processing corresponds to step S3922 in FIG. 9B and step S4019 in FIG. 10B.

In FIG. 21A, when print job deletion processing is requested, the proxy APP 143 starts the print job deletion processing (step S5101). The proxy APP 143 issues a deletion request of a print image file to the image conversion APP 144 (step S5102). The image conversion APP 144 deletes the print image file stored at the path (URI) designated by "dataUri" according to the print image file deletion request (step S5103). Next, the proxy APP 143 issues a deletion request of a print target image to the document creation APP 145 (step S5104). The document creation APP 145 deletes the print target image, that is, a print target content or a PDF file generated for printing, which is temporarily saved in the HDD 202, according to the print target image deletion request (step S5105).

The proxy APP 143 issues a deletion request of a job ticket to the document creation APP 145 (step S5106). The document creation APP 145 deletes the job ticket (print setting file) according to the job ticket deletion request (step S5107). Then, the proxy APP 143 deletes job information, and deletes that job from the job queue (FIGS. 18A to 18D) (step S5108). Then, this processing sequence ends, and the control returns to the processing sequence as a call source of this processing (step S5109).

In FIG. 21B, when reading job deletion processing is requested, the cloud scan APP 148 starts the reading job deletion processing (step S5151). The cloud scan APP 148 issues a deletion request of a temporary reading image file to the reading APP 147 (step S5152). The reading APP 147 deletes the temporary reading image file temporarily stored at the path (URI) designated by "temporaryUploadUri" according to the temporary reading image file deletion request (step S5153). Next, the cloud scan APP 148 issues a deletion request of a job ticket to the reading APP 147 (step S5154). The reading APP 147 deletes a reading setting file (job ticket) according to the job ticket deletion request (step S5155).

The cloud scan APP 148 issues a deletion request of job information to the proxy APP 143 (step S5156). The proxy APP 143 deletes the job information according to the job information deletion request, and deletes that job from the job queue (FIGS. 18A to 18D) (step S5157). Then, this processing sequence ends, and the control returns to the processing sequence as a call source of this processing (step S5158).

(Exclusive Control Cancel Processing)

FIGS. 23A and 23B show examples of the flowcharts of the exclusive control cancel processing in the MFP 3. The first embodiment will explain the processing shown in FIG. 23A. This processing corresponds to step S3626 in FIG. 6B, step S3826 in FIG. 8B, and step S3926 in FIG. 9B.

In FIG. 23A, for example, when the user presses a home button (not shown) of the operation unit 20 of the MFP 3, after the MFP 3 quits the Web browser 27, and displays a home window of the MFP 3 on the display unit 21, it starts this processing sequence (step S5301). The MFP 3 transitions from the mode for permitting only acceptance of a job notification set in step S3607 in FIG. 6A to a normal job notification reception mode (step S5302). Then, the MFP 3 cancels the exclusive control of an externally input job (step S5303). After that, this processing sequence ends (step S5304).

Note that the MFP 3 may execute the exclusive control cancel processing due to a time-out. For example, the document creation APP 145 monitors HTTP request intervals from the Web browser 27 of the MFP 3. Then, when an HTTP request from the Web browser 27 is not received for a certain time period (for example, 5 min), the document creation APP 145 notifies the MFP 3 of a time-out via the JavaScript® embedded in Web page information. More specifically, the Web browser 27 executes a Timeout function, which is exported by the MFP 3 to the Web browser 27, via the JavaScript®. When the Timeout function is called, the MFP 3 executes the exclusive control cancel processing shown in FIG. 23A.

With the aforementioned processing, in the control system including the lower-function MFP, the user's operability can be improved, and reductions of the load on the server, the data traffic of the communication channel, and the data communication cost can be attained.

Second Embodiment

The second embodiment according to the present invention will be described below.

[Processing Sequence]

FIGS. 8A and 8B show an example of the flowchart showing processing executed when a document creation APP 145 is executed from a Web browser 27 of an MFP 3 to execute a print operation. This processing sequence corresponds to FIGS. 6A and 6B in the first embodiment. Note that a description about the contents which have already been explained in FIGS. 6A and 6B will not be repeated in FIGS. 8A and 8B. More specifically, in FIGS. 8A and 8B, processes other than job registration processing (step S3815), step S3819, and job information return processing (step S3820) are the same as those in FIG. 6B, and a description thereof will not be repeated. Also, in this embodiment, a job queue has a configuration including one type of queue shown in FIG. 18B.

In step S3813 in FIG. 8B, upon acceptance of a print request from the MFP 3, the document creation APP 145 issues a print job to a cloud print APP 146. At this time, based on the print request from the MFP 3, the print job includes information indicating that a host which issued this print request of the print job is the MFP (host=mfp), and information indicating that this print job does not require any job notification to the MFP 3 (notification=no). The cloud print APP 146 inputs the print job to a print queue of the proxy APP 143 (step S3814). At this time, the cloud print APP 146 further adds an issued year/month/day/time of the print job to the print job. The proxy APP 143 executes job registration processing shown in FIG. 15A, and returns a job ID (print job ID) to the cloud print APP 146 (step S3815). Then, the proxy APP 143 waits for a print job obtaining request from the MFP 3 (step S3816).

Figure 15A:
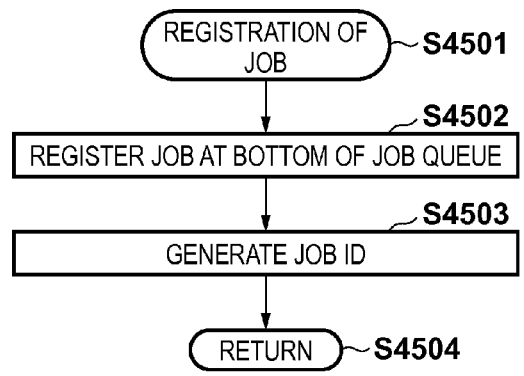
FIGS. 15A and 15B are flowcharts showing job registration processing and job information return processing in a proxy APP according to the second embodiment.

In step S3817, upon reception of information indicating that the print job has already been issued from the document creation APP 145, the MFP 3 displays a message indicating that execution of print-related processing is in progress like "in print preparation" or "print in progress" on a display unit 21. Then, the MFP 3 notifies the user of transition to the print mode (print processing in progress). At this time, the MFP 3 displays this message without using the Web browser 27 so as to reduce the load. Also, the MFP 3 obtains the job ID (print job ID) issued by the proxy APP 143 in step S3815 (FIG. 15A). The MFP 3 waits for an elapse of an assumed time period (for example, about 3 sec) required for an image conversion APP 144 to complete image conversion (step S4306 in FIG. 13) (step S3818). After that, the MFP 3 issues a job (print job) obtaining request to the proxy APP 143 by designating the job using the job ID (print job ID) (step S3819). The proxy APP 143 executes job information return processing shown in FIG. 15B, and returns print job information to the MFP 3 as a result of the processing (step S3820). The subsequent processes are the same as those in the first embodiment.

(Job Registration Processing and Job Information Return Processing)

Figure 15B:
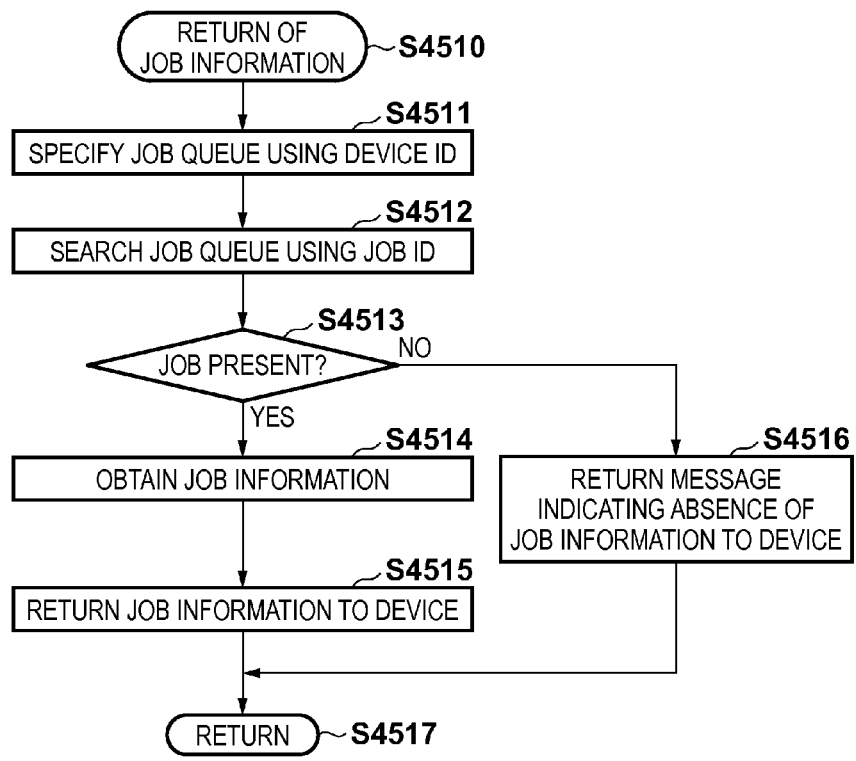

FIGS. 15A and 15B show examples of the flowcharts showing job registration processing and job information return processing in the proxy APP 143.

FIG. 15A shows an example of the flowchart showing the job registration processing in the proxy APP 143. When job registration processing is requested in step S3815 in FIG. 8B, in FIG. 15A, the proxy APP 143 starts the job registration processing (step S4501). The proxy APP 143 registers a job in the job queue (FIG. 18B), and saves respective pieces of information in a table which is required to store job information and is shown in FIG. 19A or 19B (step S4502). Then, the proxy APP 143 generates a job ID (step S4503). After that, the proxy APP 143 returns the job ID (print job ID or reading job ID) to a call source of this processing, thus ending this processing sequence (step S4504).

FIG. 15B shows an example of the flowchart showing job information return processing in the proxy APP 143. When job information return processing is requested from the MFP 3 in step S3820 in FIG. 8B, in FIG. 15B, the proxy APP 143 starts the job information return processing (step S4510). The proxy APP 143 specifies a job queue of a target device using a device ID included in job information (step S4511). Then, the proxy APP 143 confirms the presence/absence of a job which matches the job ID designated from the MFP 3 in step S3819 in FIG. 8B, in the specified job queue (step S4512). In this case, as an example of the job queue, FIG. 18B is used. If the proxy APP 143 determines that the job is present in the job queue (YES in step S4513), the process advances to step S4514; otherwise (NO in step S4513), the process advances to step S4516.

In step S4514, the proxy APP 143 obtains job information which is registered in the job queue and corresponds to the designated job ID. In step S4515, the proxy APP 143 returns the job information obtained in step S4514 to the device. Then, this processing sequence ends (step S4517). In step S4516, since a job corresponding to the job ID is not present in the job queue of the target device, the proxy APP 143 returns a message indicating that job information is absent to the request source device (MFP 3 in this case). Then, this processing sequence ends (step S4517).

Note that FIGS. 7A and 7B of the aforementioned first embodiment and the second embodiment may be combined. More specifically, in step S3715 in FIG. 7B, the MFP 3 may designate a job using a job ID (print job ID) and may issue a job (print job) obtaining request to the proxy APP 143. Also, FIGS. 9A and 9B of the third embodiment to be described later and the second embodiment may be combined. More specifically, in step S3918 in FIG. 9B, the MFP 3 may designate a job using a job ID (reading job ID), and may issue a job (reading job) obtaining request to the proxy APP 143. Likewise, FIGS. 10A and 10B of the third embodiment to be described later and the second embodiment may be combined. More specifically, in step S4015 in FIG. 10B, the MFP 3 may designate a job using a job ID (reading job ID), and may issue a job (reading job) obtaining request to the proxy APP 143.

Note that a control system in which when the proxy APP 143 includes only one job queue, as shown in FIG. 18B, the MFP 3 cannot issue a job obtaining request to the proxy APP 143 by designating a job using a job ID (print job ID) will be assumed. In this case, in step S3812 in FIG. 8B, when the Web browser 27 of the MFP 3 issues a print request to the document creation APP 145, a priority order attribute may be added to a job. At this time, the Web browser 27 adds attribute information of a "top" priority to this job. In step S3813, the document creation APP 145 transmits the attribute information of the priority of the job to the cloud print APP 146. In step S3814, the cloud print APP 146 transmits the attribute information of the priority of the job to the proxy APP 143. In step S3815, upon execution of the job registration processing shown in FIG. 15A, the proxy APP 143 confirms the priority of the job in step S4502, and registers jobs in the job queue in turn from a higher priority.

Thus, even when the MFP cannot issue a job obtaining request to the proxy APP by designating a job using a job ID, a print request issued from the Web browser of the MFP to the document creation APP can be processed as a top priority print job. As a result, the MFP 3 can print that job without being interrupted by an external job, and a system excellent in the user's operability can be provided.

Third Embodiment

The third embodiment of the present invention will be described below. The first embodiment has exemplified a print job, and this embodiment will exemplify a reading job. Note that a description about parts redundant to the first embodiment will not be repeated.

[Processing Sequence]

(Processing when MFP Issues Reading Instruction)

FIGS. 9A and 9B show an example of the flowchart showing processing executed when a reading APP 147 is executed from a Web browser 27 of an MFP 3 to read (scan) an original set on the MFP 3. In FIGS. 9A and 9B, when the user launches the Web browser 27 of the MFP 3 and executes the reading APP 147, this processing sequence is started (step S3901). The MFP 3 issues a job obtaining request to a proxy APP 143 (step S3902). The proxy APP 143 executes job information return processing shown in FIG. 14 according to the job obtaining request, and returns that processing result to the MFP 3 (step S3903). In step S3904, when the MFP 3 receives print job information or reading job information as in step S3604 of the first embodiment, it executes print processing or reading processing shown in step S3621 or step S3920.

After completion of the print processing or reading processing, the MFP 3 notifies the proxy APP 143 of that information (step S3904). In step S3905, the proxy APP 143 executes job deletion processing shown in FIGS. 21A and 21B, thus ending a series of processes related to that job (step S3906).

As described in the first embodiment, the present invention has a purpose of executing a job issued when the user operates the Web browser 27 of the MFP 3 to have the top priority. For this purpose, when the MFP 3 issues a job obtaining request to the proxy APP 143 in step S3902, it designates an option to obtain only a job in a top priority job queue in the job queue shown in FIG. 18A. Then, only when a job is registered in the top priority job queue, the proxy APP 143 returns job information to the MFP 3. Thus, a job issued from an application launched by the user from the Web browser 27 of the MFP 3 is executed to have the top priority, and the user can most preferentially operate respective applications such as the reading APP 147 by operating the Web browser 27.

In step S3907, the MFP 3 transitions to a mode for excluding an externally input job, and permitting only acceptance of a job notification, and the process advances to step S3908. FIGS. 16A and 16B show job notification reception processing executed by the MFP 3 in this mode. In step S3908, the Web browser 27 of the MFP 3 requests the reading APP 147 to transmit a home window 742 shown in FIG. 20A. The reading APP 147 transmits information of the home window 742 to the MFP 3 in response to the request (step S3909). Then, the MFP 3 displays the received home window 742 on the Web browser 27 (step S3908). When the user operates the Web browser 27 of the MFP 3 to press an upload destination setting button 739 and inputs an upload destination selection instruction of a reading image file, the Web browser 27 requests the reading APP 147 to transmit an upload destination selection window 750 shown in FIG. 20B (step S3910). The reading APP 147 transmits information of the upload destination selection window 750 to the MFP 3 in response to the request (step S3911). Then, the MFP 3 displays the upload destination selection window 750 on the Web browser 27 (step S3910).

When the user designates an upload destination of a reading image file, and presses a selection button 754, the Web browser 27 displays the home window 742. At this time, the home window 742 is updated while the upload destination of the reading image file selected by the user is reflected to an upload destination display part 733 in the home window 742. When the user presses a reading button 734, the Web browser 27 issues a reading request to the reading APP 147 (step S3912). At this time, this reading request includes information indicating that a host which issued this reading request is the MFP (host=mfp), and information indicating that this reading request does not require any job notification to the MFP 3 (notification=no).

Upon acceptance of the reading request, the reading APP 147 issues a reading job to the cloud scan APP 148 (step S3913). At this time, the reading job includes information indicating that a host which issued the reading request of the reading job is the MFP (host=mfp), and information indicating that this reading request does not require any job notification to the MFP 3 (notification=no) according to the reading request received from the MFP 3. The cloud scan APP 148 inputs the reading job to a scan queue of the proxy APP 143 (step S3914). At this time, the cloud scan APP 148 further adds issued year/month/day/time information of the reading job to the reading job. The proxy APP 143 executes job registration processing shown in FIG. 11, and returns a job ID (reading job ID) to the cloud scan APP 148 (step S3915). Then, the proxy APP 143 enters a waiting state of a reading job obtaining request from the MFP 3 (step S3916).

The cloud scan APP 148 returns the job ID (reading job ID) returned from the proxy APP 143 to the reading APP 147. Furthermore, in response to acceptance of the job ID from the cloud scan APP 148, the reading APP 147 notifies the MFP 3 of information indicating that the reading job is issued. At this time, the reading APP 147 notifies the MFP 3 of the information to be notified including the job ID (reading job ID) returned from the cloud scan APP 148. This notification can be attained by utilizing, for example, the JavaScript® embedded in Web page information. At the issuance timing of the reading job, the Web browser 27 executes a Scan function, which is exported by the MFP 3 to the Web browser 27, via the JavaScript®.

When the Scan function is called, the MFP 3 receives information representing that the reading job is registered in the scan queue. At this time, the job ID (reading job ID) included in the received information is passed to the MFP 3 as an argument of the Scan function, and the MFP 3 also obtains the job ID (reading job ID) generated by the proxy APP 143 (step S3917). In this manner, since the MFP 3 includes the Scan function, and the Web browser 27 utilizes the Scan function via the JavaScript®, an unnecessary job notification can be omitted. As a result, reductions of the load on the server, the data traffic of the communication channel, and the data communication cost can be attained.

The MFP 3 issues a job (reading job) obtaining request to the proxy APP 143 (step S3918). The proxy APP 143 executes job information return processing (FIG. 14), and returns the following reading job information to the MFP 3 as a result of that processing (step S3919).

[Example of Reading Job Information]
jobId: scn0306
dateTime: 20120814122423008
host: mfp
owner: chancy
deviceId: 77778888
ticketUri:
https://ske88funclub.com/scan/ticket/scn0306/ticket.xml
uploadUri:
https://storageservice.xxx/user/chancy/private/
temporaryUploadUri:
https://ske88funclub.com/scan/data/scn0306/
status: queued The MFP 3 obtains a storage destination of a reading setting file indicating reading settings and a temporary upload destination of a reading image file from the returned reading job information. A combination of the reading setting file and reading image file will be referred to as "reading data" hereinafter. Also, the reading setting file will also be referred to as a (reading) job ticket. The reading setting file is stored at a path (URI) designated by "ticketUri", and the reading image file will be temporarily stored at a path (URI) designated by "temporaryUploadUri" by processing of step S3920 (to be described later). The reading setting file is stored in an HDD 202 in a PC 7. A temporary upload destination of a reading image file is prepared in a storage which can be utilized by the cloud scan APP 148. In this embodiment, a reading image file is stored in the HDD 202 in the PC 7. The MFP 3 displays a message representing a reading operation method like "set original, and then press start button" on the display unit 21, thus notifying the user of the reading operation method. At this time, the MFP 3 displays this message without using the Web browser 27.

When the user sets an original and presses a start button included in an operation unit 20, the MFP 3 obtains a reading setting file by accessing the path (URI) designated by "ticketUri". The MFP 3 executes reading processing according to the contents of the reading setting file. Then, the MFP 3 uploads a reading image file generated by the reading processing to the path (URI) designated by "temporaryUploadUri", and then notifies the proxy APP 143 of completion of the reading processing (step S3920). In step S3921, the cloud scan APP 148 uploads the reading image file temporarily stored at the path (URI) designated by "temporaryUploadUri" to a path (URI) designated by "uploadUri". In step S3922, the cloud scan APP 148 executes job deletion processing (FIG. 21B), thus ending a series of processes related to that job (step S3923).

After completion of the reading processing in step S3920, the Web browser 27 of the MFP 3 requests the reading APP 147 to transmit the home window 742 (step S3924). The reading APP 147 transmits information of the home window 742 to the MFP 3 in response to the request (step S3925). The MFP 3 displays the received home window 742 on the Web browser 27 (step S3924). Then, the MFP 3 waits for a user input operation (step S3926).

(Processing when Mobile Terminal Issues Reading Instruction)

FIGS. 10A and 10B show an example of the flowchart showing processing executed when the reading APP 147 is executed from a Web browser 9 of a mobile terminal 14 to execute a reading operation. When the user launches the Web browser 9 of the mobile terminal 14 and executes the reading APP 147, the processing shown in FIGS. 10A and 10B is started (step S4001). The Web browser 9 requests the reading APP 147 to transmit the home window 742 shown in FIG. 20A (step S4002). The reading APP 147 transmits information of the home window 742 to the mobile terminal 14 in response to the request (step S4003). Then, the mobile terminal 14 displays the home window 742 on the Web browser 9 (step S4002). When the user operates the Web browser 9 of the mobile terminal 14 and presses the upload destination setting button 739, the Web browser 9 requests the reading APP 147 to transmit the upload destination selection window 750 shown in FIG. 20B (step S4004). The reading APP 147 transmits information of the upload destination selection window 750 to the mobile terminal 14 in response to the request (step S4005). Then, the Web browser 9 of the mobile terminal 14 displays the received upload destination selection window 750 (step S4004).

When the user designates an upload destination of a reading image file, and presses a selection button 754, the Web browser 9 of the mobile terminal 14 displays the home window 742. At this time, the home window 742 is updated while the upload destination of the reading image file selected by the user is reflected to the upload destination display part 733. When the user presses the reading button 734, the Web browser 9 issues a reading request to the reading APP 147 (step S4006). At this time, this reading request includes information indicating that a host which issued this reading request is the mobile terminal (host=phone), and information indicating that this reading request requires a job notification to the MFP 3 (notification=yes).

Upon acceptance of the reading request, the reading APP 147 issues a reading job to the cloud scan APP 148 (step S4007). At this time, the reading job includes information indicating that a host which issued the reading request of the reading job is the mobile terminal (host=phone), and information indicating that this reading job requires a job notification to the MFP 3 (notification=yes). The cloud scan APP 148 inputs the reading job to the scan queue of the proxy APP 143 (step S4008). At this time, the cloud scan APP 148 further adds issued year/month/day/time information of the reading job to the reading job. The proxy APP 143 executes job registration processing (FIG. 11), and returns a job ID (reading job ID) to the cloud scan APP 148 (step S4009). Then, the proxy APP 143 enters a waiting state of a job obtaining request from the mobile terminal 14 (step S4010).

In step S4008, the cloud scan APP 148 returns the job ID (reading job ID) returned from the proxy APP 143 to the reading APP 147. Upon reception of the response to the reading request issued to the reading APP 147, the Web browser 9 of the mobile terminal 14 requests the reading APP 147 to transmit a reading execution confirmation window (step S4011). The reading APP 147 transmits information of the reading execution confirmation window to the mobile terminal 14 in response to the request (step S4012). Then, the mobile terminal 14 displays the received reading execution confirmation window on the Web browser 9, and displays a message "execute reading by MFP" on the Web browser 9 (step S4011). Then, the mobile terminal 14 transitions to an upload completion waiting state (step S4013).

When the proxy APP 143 transmits a job (reading job) notification to the MFP 3 in step S4309 in FIG. 13, the MFP 3 receives this job (reading job) notification (step S4014), and issues a job (reading job) obtaining request to the proxy APP 143 (step S4015). The proxy APP 143 executes job information return processing (FIG. 14), and returns the following reading job information to the MFP 3 as a result of that processing (step S4016).

[Example of Reading Job Information]
jobId: scn0304
dateTime: 20120814122045250
host: phone
owner: akb88
deviceId: 77778888
ticketUri:
https://ske88funclub.com/scan/ticket/scn0304/ticket.xml
uploadUri:
https://storageservice.xxx/user/akb88/private/
temporaryUploadUri:
https://ske88funclub.com/scan/data/scn0304/
status: queued The MFP 3 obtains a storage destination of a reading setting file indicating reading settings and a temporary upload destination of a reading image file from the returned reading job information. The reading setting file is stored at a path (URI) designated by "ticketUri", and the reading image file will be temporarily stored at a path (URI) designated by "temporaryUploadUri" by processing of step S4017 (to be described later). A temporary upload destination of a reading image file is prepared in a storage which can be utilized by the cloud scan APP 148. In this embodiment, a reading image file is stored in the HDD 202 in the PC 7. The MFP 3 displays a message representing a reading operation method like "set original, and then press start button" on the display unit 21, thus notifying the user of the reading operation method. At this time, the MFP 3 displays this message without using the Web browser 27.

When the user sets an original and presses a start button included in the operation unit 20, the MFP 3 obtains a reading setting file by accessing the path (URI) designated by "ticketUri". The MFP 3 executes reading processing according to the contents of the reading setting file. Then, the MFP 3 uploads a reading image file generated by the reading processing to the path (URI) designated by "temporaryUploadUri", and then notifies the proxy APP 143 of completion of the reading processing (step S4017). Then, the MFP 3 transitions to an online standby state (step S4021). In step S4018, the cloud scan APP 148 uploads the reading image file temporarily stored at the path (URI) designated by "temporaryUploadUri" to a path (URI) designated by "uploadUri". In step S4019, the cloud scan APP 148 executes job deletion processing (FIG. 21B), thus ending a series of processes related to that job (step S4020).

Upon completion of the upload processing by the cloud scan APP 148 in step S4018, the Web browser 9 of the mobile terminal 14 is notified of that information via the reading APP 147 (FIGS. 10A and 10B do not show the sequence of this part). Then, the Web browser 9 requests the reading APP 147 to transmit the home window 742 (step S4022). The reading APP 147 transmits information of the home window 742 to the mobile terminal 14 in response to the request (step S4023). The mobile terminal 14 displays the received home window 742 on the Web browser 9 (step S4022). Then, the mobile terminal 14 waits for a user input operation (step S4024).

As described above, the present invention can be similarly applied to the reading job as in the print job in the first embodiment.

Fourth Embodiment

The first embodiment has exemplified the case in which the user operates a Web browser 27 of an MFP 3 to print a document opened by a document creation APP 145, as shown in FIGS. 6A and 6B. In this case, a mechanism in which the user operates the Web browser 27 of the MFP 3, the document creation APP 145 issues one print job, and the MFP 3 prints that print job with the top priority can be realized. However, a case will be examined wherein the document creation APP 145 includes a function of successively printing a plurality of documents in turn. In this case, in the first embodiment, since a top priority job queue shown in FIG. 18A has a size for one job, print jobs successively issued from the document creation APP 145 cannot be correctly printed in an order they are issued. The fourth embodiment will explain an example which can solve this problem. Note that in the description of the fourth embodiments, a description of the contents which have already been described in the first to third embodiments will not be repeated.

(Job Registration Processing)

Figure 12:
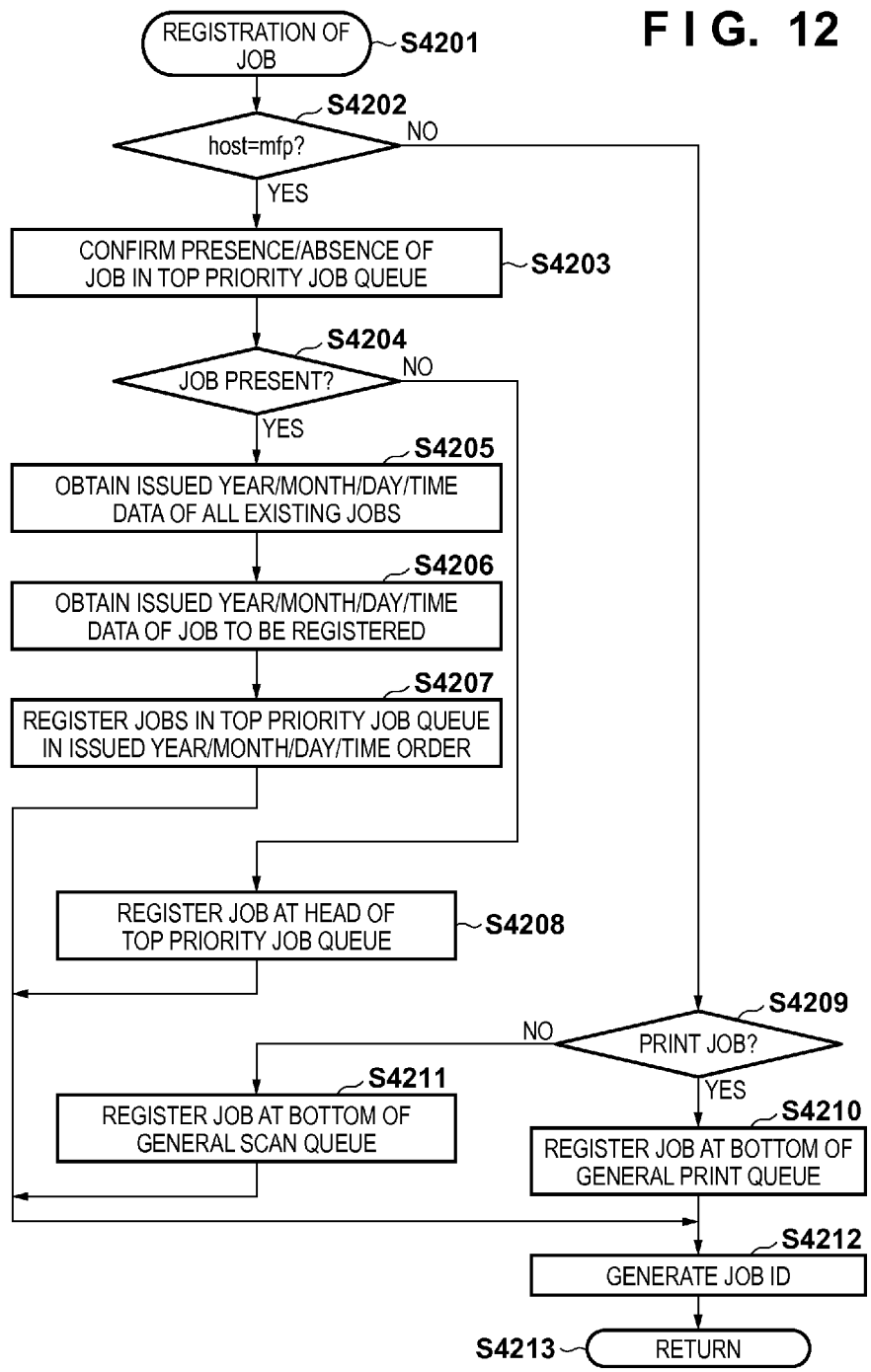
FIG. 12 is a flowchart showing job registration processing in a proxy APP according to the fourth embodiment.

FIG. 12 shows an example of the flowchart showing job registration processing in a proxy APP 143. This processing is executed in place of FIG. 11 in the processes of step S3615 in FIG. 6B, S3709 in FIG. 7A, step S3815 in FIG. 8B, step S3915 in FIG. 9B, and step S4009 in FIG. 10A. Also, this embodiment uses the job queue configuration shown in FIG. 18D.

When job registration processing is requested, in FIG. 12, the proxy APP 143 starts the job registration processing (step S4201). In step S4202, the proxy APP 143 confirms a type of a host as a job request source. If the proxy APP 143 determines that the host is an MFP (host=mfp) (YES in step S4202), the process advances to step S4203; if it determines that the host is other than the MFP (mobile terminal or PC) (NO in step S4202), the process advances to step S4209.

In step S4203, the proxy APP 143 confirms the presence/absence of jobs in the top priority job queue in the job queue shown in FIG. 18D. If the proxy APP 143 determines that jobs are present in the top priority job queue in the job queue (YES in step S4204), the process advances to step S4205; otherwise (NO in step S4204), the process jumps to step S4208. In step S4205, the proxy APP 143 obtains issued year/month/day/time data of respective jobs with reference to job information shown in FIG. 19A for all existing jobs in the top priority job queue.

In step S4206, the proxy APP 143 obtains issued year/month/day/time data of the job as a registration target. In step S4207, the proxy APP 143 registers the job in the top priority job queue in an issued year/month/day/time order, and saves respective pieces of information in a table which is required to store job information and is shown in FIG. 19A. In step S4208, the proxy APP 143 registers the job at the head position in the top priority job queue.

In step S4209, the proxy APP 143 confirms a job type. If the proxy APP 143 determines that the job type is a print job (YES in step S4209), the process advances to step S4210; if it determines that the job type is another job type (reading job) (NO in step S4209), the process advances to step S4211. In step S4210, the proxy APP 143 registers the job at the bottom position of a general print queue in the job queue shown in FIG. 18D, and saves respective pieces of information in the table which is required to store job information and is shown in FIG. 19A or 19B. In step S4211, the proxy APP 143 registers the job in a general scan queue in the job queue shown in FIG. 18D, and saves respective pieces of information in the table which in required to store job information and is shown in FIG. 19A or 19B. After the job registration, the proxy APP 143 generates a job ID (print job ID or reading job ID) in step S4212. In step S4213, the proxy APP 143 returns the job ID (print job ID or reading job ID) to a call source of this processing, thus ending this processing sequence (step S4213).

As described above, in addition to the effects of the first embodiment, a plurality of jobs successively issued by the MFP can be processed in a correct order.

Fifth Embodiment

The first to third embodiments have exemplified the case in which a document creation APP 145 or reading APP 147 notifies an MFP 3 of information indicating that a job has been issued. As another embodiment, in place of the case in which the document creation APP 145 (or reading APP 147) notifies the MFP 3 of information indicating that a job has been issued, a proxy APP 143 may issue a job notification to the MFP 3. At this time, the proxy APP 143 notifies the MFP 3 of the job notification including a job ID (print job ID or reading job ID). Thus, the MFP 3 need not wait for an elapse of an assumed time required for image conversion in step S3618 in FIG. 6B or step S3818 in FIG. 8B.

In this embodiment, processing after the proxy APP 143 executes job registration processing (step S3615 in FIG. 6B, step S3815 in FIG. 8B, and step S3915 in FIG. 9B) is different from the above embodiments. More specifically, the proxy APP 143 adds information representing that a target job is a job issued from a Web browser 27 of the MFP 3, that is, a job, a host of which is the MFP (host=mfp) to a job notification, and issues the job notification to the MFP 3. As a result, the MFP 3 receives the job notification without any waiting time for image conversion processing. Then, the MFP 3 executes processing shown in FIG. 16B to be described later in place of that shown in FIG. 16A described in the first embodiment, thus efficiently executing print processing or reading processing. Thus, the MFP 3 receives the job notification during an interval between steps S3617 to S3619 (or steps S3817 to S3819 or steps S3917 to S3918) without executing the processing of step S3618 in FIG. 6B (or step S3818 in FIG. 8B).

FIG. 16B is a flowchart showing job notification reception processing in the MFP 3. Note that job notification presence information is the same as that in FIG. 16A described in the first embodiment. Also, in FIG. 16B, the same step numbers denote the steps which execute the same processes as those described in FIG. 16A, and a description thereof may not be repeated.

Upon reception of a job notification issued from the proxy APP 143, in FIG. 16B, the MFP 3 starts job notification reception processing (step S4601). The MFP 3 confirms whether or not an application is in execution on the Web browser 27 (step S4602). If the MFP 3 determines that the application is in execution on the Web browser 27 (YES in step S4603), the process advances to step S4609; otherwise (NO in step S4603), the process advances to step S4605. Note that when the MFP 3 launches the Web browser 27 but no application is executed, it is determined in step S4603 that the application is in execution on the Web browser 27.

In step S4609, based on information added to the job notification, the MFP 3 confirms whether or not the job is that issued from a device, that is, it is a job, a host of which is the MFP (host=mfp). If the MFP 3 determines that the job is that issued from the device (NO in step S4610), the process advances to step S4604; otherwise (YES in step S4610), the process advances to step S4605.

In step S4606, the MFP 3 receives print job information or reading job information, and the process advances to step S4607. A description of the subsequent processes will not be given. Thus, in addition to the effects of the first embodiment, a processing waiting time can be reduced.

Sixth Embodiment

Still another embodiment according to the present invention will be described as the sixth embodiment. A case will be examined below wherein the user launches a document creation APP 145 or reading APP 147 from a Web browser 27 of an MFP 3 to make a print request operation or reading request operation, and the document creation APP 145 or reading APP 147 issues a job. In such case, it is expected that the MFP 3 surely obtains and processes the issued job.

In this embodiment, for example, in step S3619 in FIG. 6B described in the first embodiment, when the MFP 3 issues a job obtaining request to a proxy APP 143, it adds, to this job obtaining request, an attribute which requests only job information of a job issued from a device, that is, a job, a host of which is the MFP (host=mfp). Upon reception of this job information, the proxy APP 143 executes only processes of steps S4401 to S4404 and S4412 to S4414 in FIG. 14, and returns job information in a top priority job queue to the MFP 3. In this case, when the proxy APP 143 determines that no job is present in the top priority job queue (NO in step S4404), it executes only the processes of steps S4411 and S4414. Thus, a job which is issued when the user operates the Web browser 27 of the MFP 3 to make a print request operation or reading request operation can be surely printed by the MFP 3 without being interrupted by another job, thus improving the user's operability.

In step S3617 in FIG. 6B, the MFP 3 confirms an obtained job ID. As a result, the MFP 3 determines a print job since the obtained job ID is that with "prn". The MFP 3 adds, in step S3619, an attribute which requests only job information of a print job, as described above when it issues a job (print job) obtaining request to the proxy APP 143. Upon reception of the job information added with this attribute information, the proxy APP 143 confirms the presence/absence of only a print job from those in a top priority job queue in step S4403 in FIG. 14. Then, if the proxy APP 143 determines that a print job is present (YES in step S4404), it executes the processes of steps S4412 to S4414 to return job information of the print job to the MFP 3. Otherwise (NO in step S4404), the MFP 3 executes the processes of steps S4411 and S4414. Thus, when the document creation APP 145 issues a print job, the MFP 3 can surely receive that print job and can execute print processing, thus improving the user's operability.

The same applies to a reading job. In this case, a job ID is given with "scn". Therefore, even when the reading APP 147 issues a reading job, the MFP 3 can surely receive that reading job and can execute reading processing, thus improving the user's operability.

Seventh Embodiment

The first embodiment has exemplified the case in which a user operation of a document creation APP 145 utilizing a Web browser 27 is temporarily not accepted during an interval from an operation in step S3612 until step S3624 in FIG. 6B, and an MFP 3 executes print processing. At this time, the MFP 3 executes print processing without quitting the Web browser 27. However, some low-end MFPs cannot execute print processing while a Web browser is active due to limitations on hardware resources such as a CPU 15 and RAM 17. The seventh embodiment to cope with such a case will be described.

Figure 22B:
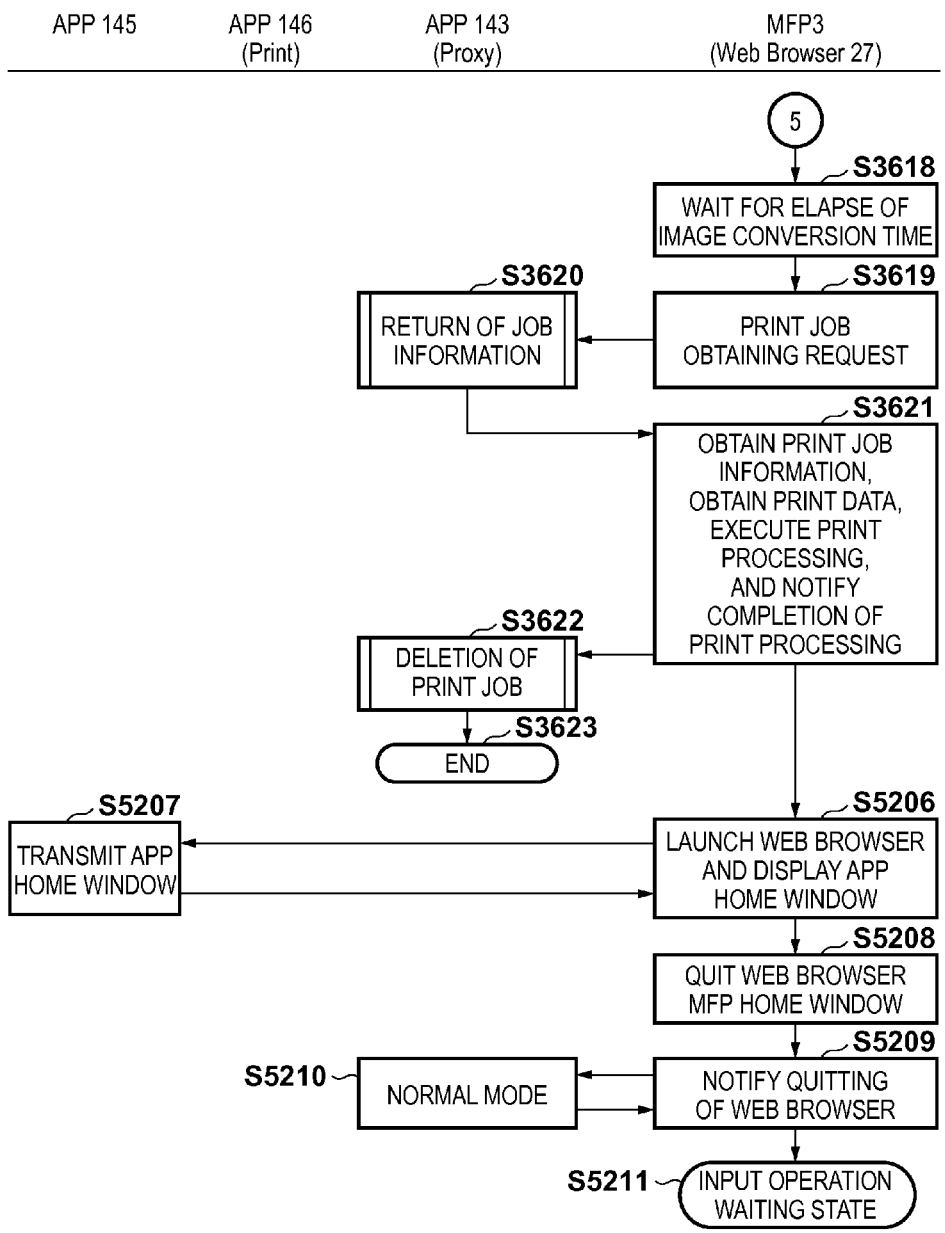

FIGS. 22A and 22B show an example of the flowchart showing processing when the document creation APP 145 is executed from the Web browser 27 of the MFP 3 to execute print processing. FIGS. 22A and 22B correspond to FIGS. 6A and 6B described in the first embodiment. The same step numbers denote the contents which have already been described in FIGS. 6A and 6B, and a description thereof will not be repeated in FIGS. 22A and 22B. Also, processes corresponding to steps S3602 to S3606 in FIG. 6A are not shown in FIGS. 22A and 22B, and a description thereof will not be repeated, either.

In FIGS. 22A and 22B, when the user launches the Web browser 27 of the MFP 3 and executes the document creation APP 145, this processing sequence is started (step S5201). The MFP 3 excludes an externally input job, and also excludes a job notification by disconnecting a job notification communication link (step S5202). The MFP 3 notifies a proxy APP 143 of information indicating that the Web browser 27 is in use (step S5203). Upon reception of the information indicating that the Web browser 27 is in use from the MFP 3, the proxy APP 143 transitions from a normal mode to an MFP dedicated mode when a target device which processes a job is the MFP 3 (step S5204).

In this "MFP dedicated mode", the proxy APP 143 determines by adding a condition that limits a job range to a job, a host of which is the MFP (host=mfp) as a determination condition in step S4304 or S4307 in FIG. 13. Therefore, in the MFP dedicated mode, even when a job, a host of which is other than the MFP (host=phone), is present in a job queue in step S4304 or S4307 in FIG. 13, the proxy APP 143 determines "false" (NO in step S4304 or S4307). By contrast, only when a job, a host of which is the MFP (host=mfp) is present, the proxy APP 143 determines "true" (YES in step S4304 or S4307). Also, in the MFP dedicated mode, in FIG. 14, the MFP 3 executes only processes of steps S4401 to S4404 and S4412 to S4414, and does not execute those of steps S4405 to S4411.

Thus, when the proxy APP 143 is in the MFP dedicated mode of the target device (MFP 3 in this case), only a job issued from the document creation APP 145 or reading APP 147 when the user operates the Web browser 27 of the MFP 3 is processed.

After the proxy APP 143 transitions to the MFP dedicated mode in step S5204, processes of steps S3608 to S3616 are executed. During execution of these processes, the document creation APP 145 notifies the MFP 3 of information indicating that a print job has been issued. At this time, the document creation APP 145 notifies the MFP 3 of the information to be notified, which includes a job ID (print job ID) returned from a cloud print APP 146. This notification can be implemented by utilizing, for example, the JavaScript® embedded in Web page information.

When a print job is issued, the Web browser 27 executes a Print function, which is exported by the MFP 3 to the Web browser 27, via the JavaScript®. When the Print function is called, the MFP 3 receives information representing that the print job is registered in the print queue. At this time, a job ID (print job ID) included in the received information is passed to the MFP 3 as an argument of the Print function, and the MFP 3 also obtains the job ID (print job ID) generated by the print APP 143 (step S5205).

The MFP 3 saves a URL (Uniform Resource Locator) of a page (a home window of the document creation APP 145) to be displayed at the next launch timing of the Web browser 27 in a RAM 17, thus quitting the Web browser 27 (step S5205). Furthermore, in step S5205, upon reception of information indicating that the print job has already been issued, the MFP 3 displays a message indicating that execution of print-related processing is in progress like "in print preparation" or "print in progress" on the display unit 21. Then, the MFP 3 notifies the user of transition to a print mode (print processing in progress). At this time, the MFP 3 displays this message without using the Web browser 27. After that, processes of steps S3618 to S3623 are executed, and the process then advances to step S5206.

In step S5206, the MFP 3 launches the Web browser 27. Then, the Web browser 27 accesses the page (the home window of the document creation APP 145) designated by the URL saved in the RAM 17 in step S5205 to request the document creation APP 145 to transmit the home window. The document creation APP 145 transmits information of the home window to the MFP 3 in response to the request (step S5207). The MFP 3 displays the home window on the Web browser 27 (step S5206).

When the user presses a home button (not shown) of an operation unit 20 of the MFP 3, the MFP 3 quits the Web browser 27, and displays a home window of the MFP 3 on the display unit 21 (step S5208). The MFP 3 notifies the proxy APP 143 of information indicating that the Web browser 27 has been quit (step S5209). Upon reception of the notification indicating the Web browser has been quit from the MFP 3, the proxy APP 143 transitions from the MFP dedicated mode to the normal mode when the target device which processes a job is the MFP 3 (step S5210). Then, the MFP 3 waits for a user input operation (step S5211).

(Exclusive Control Cancel Processing)

FIG. 23B is a flowchart showing exclusive control cancel processing in the MFP 3 according to this embodiment. This processing is executed in place of that shown in FIG. 23A described in the first embodiment. After the MFP 3 quits the Web browser 27 and displays the MFP home window on the display unit 21 in step S5208 in FIG. 22B, it starts this processing sequence (step S5351). The MFP 3 establishes a job notification communication link, which was disconnected in step S5202 in FIG. 22A, to cancel the exclusive control of a job notification (step S5352). Then, the MFP 3 cancels the exclusive control of an externally input job (step S5353). After that, this processing sequence ends (step S5354).

The MFP 3 may execute the exclusive control cancel processing when a time-out is reached. For example, the document creation APP 145 monitors HTTP request intervals from the Web browser 27 of the MFP 3. Then, when an HTTP request from the Web browser 27 is not received for a certain time period (for example, 5 min), the document creation APP 145 notifies the MFP 3 of a time-out via the JavaScript® embedded in Web page information. More specifically, the Web browser 27 executes a Timeout function, which is exported by the MFP 3 to the Web browser 27, via the JavaScript®. When the Timeout function is called, the MFP 3 executes the exclusive control cancel processing shown in FIG. 23B.

Furthermore, with FIGS. 22A and 22B, the configuration for transitioning to a mode which permits only acceptance of a job notification by excluding an externally input job (step S3607 in FIG. 6A) and the fifth embodiment may be combined. Thus, as shown in step S4309 in FIG. 13, the proxy APP 143 is configured to issue a job notification to the MFP 3. At this time, the proxy APP 143 issues a job notification to the MFP 3 only when a job, a host of which is the MFP (host=mfp), is present in a job queue. As a result, the MFP 3 executes only a job, a host of which is the MFP (host=mfp), and need not wait for an elapse of an assumed time required for image conversion unlike in step S3618, thus improving the user's operability. Note that in this case, in step S5208 in FIG. 22B, the MFP 3 executes the exclusive control cancel processing shown in FIG. 23A after it quits the Web browser 27 and displays the MFP home window on the display unit 21.

Eighth Embodiment

Still another embodiment of the present invention will be described below. For example, when an MFP is a low-end one in which an operation unit 20 does not include any buttons required to make complicated operations, and no display unit 21 is included, a mobile terminal may be used in place of the operation unit 20 and display unit 21 in some cases. The following two cases are assumed as an example of such case.

Case 1: The mobile terminal and MFP are connected via USB (Universal Serial Bus) or the like Case 2: The mobile terminal and MFP are connected via a wireless network.

In case 1, the MFP is registered in a cloud print service and cloud scan service via the mobile terminal. In this case, when a Web browser of the mobile terminal issues a print request to a document creation APP 145 or issues a reading request to a reading APP 147, it executes the same processing as the MFP 3 (Web browser 27) shown in FIGS. 6, 8, and 9.

In case 2, when the document creation APP 145 or reading APP 147 is opened from the Web browser of the mobile terminal, each APP determines whether or not the mobile terminal is operated from the same place as that of the MFP. As this determination method, for example, a global IP address or MAC address of a router to which the mobile terminal is connected, and that of a router to which the MFP is connected are obtained. Then, when the two global IP addresses match, the configuration of case 2 can be determined. As another determination method, when the two MAC addresses match, the same place is determined. When it is determined that the mobile terminal is operated from the same place as the MFP, and when the Web browser of the mobile terminal issues a print request to the document creation APP 145 or issues a reading request to the reading APP 147, it executes the same processing as the MFP 3 (Web browser 27) shown in FIGS. 6, 8, and 9.

In this manner, even when the MFP includes neither an operation unit including buttons required to make complicated operations nor the display unit 21, and when the mobile terminal is used in place of the operation unit and display unit, the present invention is applicable. As a result, in the same manner as in the operation of the Web browser 27 of the MFP 3, a print request or reading request issued from the Web browser of the mobile terminal can be processed with the top priority, thus assuring excellent user's operability.

Ninth Embodiment

The aforementioned embodiments assume a PC as an information processing apparatus. However, the present invention is not limited to this example, and it is applicable to an arbitrary information processing apparatus (terminal) (for example, a DVD player, game, set-top box, Internet home appliances, and the like), which allows a similar use method. Also, the aforementioned embodiments assume an MFP as a peripheral apparatus. However, the peripheral apparatus may be any of a copying machine, facsimile, scanner, digital camera, apparatus including these multi-functions, and the like.

The aforementioned embodiments have exemplified the Windows® OS as an OS. However, the present invention is not limited to this, and an arbitrary OS can be used. The aforementioned embodiments use Ethernet® as a network configuration example. However, the present invention is not limited to such specific example, and an arbitrary interface such as a wireless LAN, IEEE1394, Bluetooth®, or USB may be used. Also, functions in various applications (firmware), and some or all of processes related to the aforementioned flowcharts may be configured using dedicated hardware.

According to the aforementioned embodiments, even when a cloud system is used as a control system, it is easy to built the system and to implement applications, thus reducing development and management costs. Also, since no problem is posed for implementation of firmware for a low-performance printer or a low-end MFP like the MFP 3, and respective processes do not require long time, the user's operability can be improved.

An application which is used to print a document like the document creation APP 145 has been exemplified. However, the present invention is not limited to this. For example, the present invention may be applied to an application used to print a photo, that used to transmit or receive facsimile data, that which utilizes or controls other peripheral apparatuses, and the like.

Details of the processes in principal cases have been explained using the flowcharts shown in FIGS. 6A to 17 and FIGS. 21A to 23B. However, the present invention is not limited to these cases. For example, an embodiment (case) obtained by combining respective processing steps in these figures and a control system obtained by combining a general control system and the present invention are included in the application range of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-022645, filed Feb. 7, 2013, which is hereby incorporated by reference herein in its entirety.

What is claimed is:

1. A system including an application server, and a job processing apparatus,
the job processing apparatus comprising:
at least one processor, wherein at least one of the at least one processor is configured to function as:
a display unit configured to display screen including a content provided by a server external to the job processing apparatus;
a request unit configured to request, to the application server, issuing a job for printing an image, through the display screen displayed by the display unit in accordance with a user operation to the job processing apparatus; and
the application server comprising:
at least one processor, wherein at least one of the at least one processor is configured to function as:
an issuing unit configured to issue the job according to the request of issuing the job,
wherein at least one of the at least one processor of the job processing apparatus is further configured to function as:
a receiving unit configured to receive a job; and
a performing unit configured to perform printing process for printing an image based on the received job,
wherein the performing unit is controlled so that,
if a job, which has been issued as a job to be processed by the job processing apparatus, is a first job issued through the display screen, the printing process, which has been required to the job processing apparatus based on the first job, is performed, and
if a job, which has been issued as the job to be processed by the job processing apparatus in a state where the display screen is displayed by the display unit, is a second job issued without going through the display screen, the printing process which has been required to the job processing apparatus based on the second job, is not performed, based on a fact that the job, which has been issued as the job to be processed by the job processing apparatus in the stage where the display screen is displayed by the display unit, is not the first job but the second job.

2. The system according to claim 1, wherein the system includes a job management server,
the job management server comprising:
at least one processor, wherein at least one of the at least one processor is configured to function as:
a registration unit configured to register the job issued by the issuing unit in a job queue; and
a notification unit configured not to send a notification to the job processing apparatus, if the first job is registered in the job queue by the registration unit, and to send the notification to the job processing apparatus, if the second job is registered in the job queue by the registration unit.

3. The system according to claim 1, wherein at least one of the at least one processor of the job processing apparatus is further configured to function as:
an obtaining unit configured to obtain an identifier of the job issued by issuing unit; and
a job request unit configured to request a job to the Web application server using the identifier,
wherein the receiving unit receives a job requested by the job request unit.

4. The system according to claim 1, wherein at least one of the at least one processor of the job processing apparatus is further configured to function as:
a job request unit configured to request a job,
wherein the receiving unit receives a job requested by the job request unit, and
wherein the job request unit does not request, in the stage where the display screen is displayed by the display unit, the at least one second job.

5. The system according to claim 1,
wherein the system includes a job management server,
the job management server comprises:
at least one processor, wherein at least one of the at least one processor is configured to function as:
a registration unit configured to register a job issued by the issuing unit in a job queue, wherein the registration unit registers the first job in a first job queue, and registers the at least one job, for printing the image, issued based on the request in accordance with the user operation to the terminal apparatus, in a second job queue of which a priority is lower than the first job queue,
wherein the performing unit is controlled so that in the stage where the display screen is displayed by the display unit, the printing process based on a job registered in the first job queue is performed, and the printing process based on a job registered in the second job queue is not performed.

6. The system according to claim 5, wherein the registration unit is configured to register a plurality of jobs in the first job queue in an order the jobs are issued.

7. The system according to claim 1, wherein the second job is a job for printing the content included in the display screen displayed by the terminal apparatus.

8. The system according to claim 1,
wherein the job processing apparatus is an inkjet printer.

9. The system according to claim 1, wherein the performing unit is controlled so that
if a job, which has been issued as the job to be processed by the job processing in the state where the display screen is displayed by the display unit, is the second job, all of the printing process, which has been required to the job processing apparatus based on the second job, is not performed, based on the fact that the job, which has been issued as the job to be processed by the job processing apparatus in the stage where the display screen is displayed by the display unit, is not the first job but the second job.

10. The system according to claim 1, wherein the printing process, which has been required to the job processing apparatus based on the second job and is controlled not to be performed, is performed after completion of the printing processing, which has been required to the job processing apparatus based on the first job.

11. A job processing apparatus comprising:
  at least one processor, wherein at least one of the at least one processor is configured to function as:
  a display unit configured to display a display screen including a content provided by a server in accordance with a user operation;
  a request unit configured to request issuing a job for printing an image, through the display screen displayed by the display unit in accordance with a user operation to the job processing apparatus;
  a receiving unit configured to receive a job; and
  a performing unit configured to perform printing process for printing an image based on the received job
  wherein the performing unit is controlled so that,
  if a job, which has been issued as a job to be processed by the job processing apparatus, is a first job issued through the display screen, the printing process, which has been required to the job processing apparatus based on the first job, is performed, and
  if a job, which has been issued as the job to be processed by the job processing apparatus in a state where the display screen is displayed by the display unit, is a second job issued without going through the display screen, the printing process, which has been required to the job processing apparatus based on the second job, is not performed, based on a fact that the job, which has been issued as the job to be processed by the job processing apparatus in the stage where the display screen is displayed by the display unit, is not the first job but the second job.

12. The job processing apparatus according to claim 11, wherein at least one of the at least one processor is further configured to function as:
  a job request unit configured to request a job,
  wherein the receiving unit receives a job requested by the job request unit,
  wherein, the job request unit does not request, in the stage where the display screen is displayed by the display unit, the at least one second job.

13. The job processing apparatus according to claim 11, wherein at least one of the at least one processor is further configured to function as a notification receiving unit configured to receive a notification indicating that a job has been issued,
  wherein the notification receiving unit does not receive a notification indicating that the first job, has been issued, and receives a notification indicating that the second job has been issued.

14. The job processing apparatus according to claim 11, wherein the second job is a job for printing the content included in the display screen displayed by the terminal apparatus.

15. The job processing apparatus according to claim 11, wherein at least one of the at least one processor is further configured to function as a sending unit configured, if the request unit requests issuing the job for printing the content included in the display screen displayed by the display unit, to send information indicating that a request source is the job processing apparatus.

16. The job processing apparatus according to claim 11, wherein the server is a Web application server that provides a Web application to the job processing apparatus.

17. The job processing apparatus according to claim 11, wherein the job processing apparatus is an inkjet printer.

18. The job processing apparatus according to claim 11, wherein the performing unit is controlled so that
  if a job, which has been issued as the job to be processed by the job processing in the state where the display screen is displayed by the display unit, is the second job, all of the printing process, which has been required to the job processing apparatus based on the second job, is not performed, based on the fact that the job, which has been issued as the job to be processed by the job processing apparatus in the stage where the display screen is displayed by the display unit, is not the first job but the second job.

19. The job processing apparatus according to claim 11, wherein the printing process, which has been required to the job processing apparatus based on the second job and is controlled not to be performed, is performed after completion of the printing processing, which has been required to the job processing apparatus based on the first job.

20. A control method of a job processing apparatus comprising:
  displaying a display screen including a content provided by a server in accordance with a user operation;
  requesting issuing a job for printing an image, through the display screen displayed by the display unit in accordance with a user operation to the job processing apparatus;
  receiving a job; and
  performing printing process for printing an image based on the received job;
  wherein, if a job, which has been issued as a job to be processed by the job processing apparatus, is a first job issued through the display screen, the printing process, which has been required to the job processing apparatus based on the first job, and
  if a job, which has been issued as the job to be processed by the job processing apparatus in a state where the display screen is displayed by the display unit, is a second job issued without going through the display screen, the printing process, which has been required to the job processing apparatus based on the second job, is not performed, based on a fact that the job, which has been issued as the job to be processed by the job processing apparatus in the stage where the display screen is displayed by the display unit, is not the first job but the second job.

21. The control method according to claim 20, wherein the job processing apparatus is an inkjet printer.

* * * * *